United States Patent
Mowris et al.

(10) Patent No.: US 10,712,036 B2
(45) Date of Patent: Jul. 14, 2020

(54) FAULT DETECTION DIAGNOSTIC VARIABLE DIFFERENTIAL VARIABLE DELAY THERMOSTAT

(71) Applicants: Robert J. Mowris, Olympic Valley, CA (US); John Walsh, Bozeman, MT (US)

(72) Inventors: Robert J. Mowris, Olympic Valley, CA (US); John Walsh, Bozeman, MT (US)

( * ) Notice: Subject to any disclaimer, the term of this patent is extended or adjusted under 35 U.S.C. 154(b) by 0 days.

(21) Appl. No.: 16/289,313

(22) Filed: Feb. 28, 2019

(65) Prior Publication Data
US 2019/0195523 A1     Jun. 27, 2019

Related U.S. Application Data

(62) Division of application No. 15/614,600, filed on Jun. 5, 2017, now Pat. No. 10,281,938.

(51) Int. Cl.
*F24F 11/38* (2018.01)
*F24F 11/61* (2018.01)
(Continued)

(52) U.S. Cl.
CPC .......... *F24F 11/38* (2018.01); *F24D 19/1087* (2013.01); *F24F 11/0001* (2013.01);
(Continued)

(58) Field of Classification Search
CPC ........ F24F 11/0001; F24F 11/38; F24F 11/58; F24F 11/61; F24F 11/64; F24F 11/67;
(Continued)

(56) References Cited

U.S. PATENT DOCUMENTS 2,394,920 A    12/1942   Kronmiller
3,192,162 A    6/1965   Bauer et al.
(Continued)

FOREIGN PATENT DOCUMENTS

WO    WO1996041246    6/1996
WO    WO-2013/149160    10/2013

OTHER PUBLICATIONS

Carrier Corporation. "EconoMi$er X, Factory—Installed Option, Low Leak Economizer for 2 Speed SAV (Staged Air Volume) Systems, Installation, Setup & Troubleshooting Supplement," Date: Feb. 2012, pp. 12, Published by Carrier Corporation, 7310 W. Morris St. D, Indianapolis, IN 46231, USA, https://dms.hvacpartners.com/docs/1009/Public/01/LLECON-01SI.pdf.
(Continued)

*Primary Examiner* — Marc E Norman
(74) *Attorney, Agent, or Firm* — Kenneth L. Green; Averill & Green

(57) ABSTRACT

A Fault Detection Diagnostic (FDD) variable differential and variable fan-off delay Heating Ventilating Air Conditioning (HVAC) thermostat control method. The FDD method detects a fan-on setting, reports a FDD fan-on alarm, overrides a fan-on setting, and turns off an HVAC fan. The FDD method detects, reports, and corrects a short-cycle by providing a variable differential based on: a cooling or heating cycle duration, or an off-cycle time. The variable fan-off delay is based on: a Conditioned Space Temperature (CST), comparing a current CST to the CST measured during the fan-off delay, a rate of change of CST with respect to time (dT/dt), dT/dt reaches an inflection point, the CST crosses a fan-off-delay differential, a cooling cycle duration, a heating cycle duration, a cooling temperature split, a heating temperature rise, an outdoor air temperature, a supply air temperature, or the rate of change with respect to time of these HVAC parameters.

35 Claims, 14 Drawing Sheets

(51) Int. Cl.
- *F24F 11/74* (2018.01)
- *F24F 11/58* (2018.01)
- *F24F 11/64* (2018.01)
- *F24F 11/76* (2018.01)
- *F24F 11/77* (2018.01)
- *F24D 19/10* (2006.01)
- *G05D 23/19* (2006.01)
- *G05B 13/02* (2006.01)
- *F24F 11/00* (2018.01)
- F24F 110/70 (2018.01)
- F24F 110/10 (2018.01)
- F24F 110/12 (2018.01)
- F24F 110/20 (2018.01)
- F24F 120/10 (2018.01)
- F24F 11/67 (2018.01)

(52) U.S. Cl.
CPC .............. *F24F 11/58* (2018.01); *F24F 11/61* (2018.01); *F24F 11/64* (2018.01); *F24F 11/74* (2018.01); *F24F 11/76* (2018.01); *F24F 11/77* (2018.01); *G05B 13/021* (2013.01); *G05D 23/1951* (2013.01); *F24F 11/67* (2018.01); *F24F 2011/0002* (2013.01); *F24F 2110/10* (2018.01); *F24F 2110/12* (2018.01); *F24F 2110/20* (2018.01); *F24F 2110/70* (2018.01); *F24F 2120/10* (2018.01)

(58) Field of Classification Search
CPC .. F24F 11/74; F24F 11/76; F24F 11/77; F24F 2011/0002; F24F 2110/10; F24F 2110/20; F24F 2110/70; G05D 23/1951
See application file for complete search history.

(56) References Cited

U.S. PATENT DOCUMENTS

| | | | |
|---|---|---|---|
| 3,416,309 | A | 12/1968 | Fiedler |
| 3,454,073 | A | 7/1969 | Man |
| 4,075,864 | A | 2/1978 | Schrader |
| 4,136,730 | A | 1/1979 | Kinsey |
| 4,136,822 | A | 1/1979 | Felter |
| 4,369,916 | A | 1/1983 | Abbey |
| 4,388,692 | A | 6/1983 | Jones et al. |
| 4,493,194 | A | 1/1985 | Briccetti |
| 4,685,060 | A | 8/1987 | Adams et al. |
| 4,773,587 | A | 9/1988 | Lipman |
| 4,842,044 | A | 6/1989 | Flanders et al. |
| 4,897,798 | A | 1/1990 | Cler |
| 5,050,488 | A | 9/1991 | Beasley |
| 5,142,880 | A | 9/1992 | Bellis |
| 5,239,834 | A | 8/1993 | Travers |
| 5,248,083 | A | 9/1993 | Adams |
| 5,582,233 | A | 12/1996 | Noto |
| 5,882,233 | A | 3/1999 | Idehara |
| 6,220,039 | B1 | 4/2001 | Kensok |
| 6,282,910 | B1 | 9/2001 | Helt |
| 6,464,000 | B1 | 10/2002 | Kloster |
| 6,684,944 | B1 | 2/2004 | Byrnes et al. |
| 6,695,046 | B1 | 2/2004 | Byrnes |
| 6,708,135 | B2 | 3/2004 | Southworth et al. |
| 7,240,851 | B2 | 7/2007 | Walsh, Jr. |
| 8,091,375 | B2 | 1/2012 | Crawford |
| 8,141,373 | B2 | 3/2012 | Peterson et al. |
| 8,195,313 | B1 | 6/2012 | Fadell |
| 8,362,725 | B2 | 1/2013 | Becerra et al. |
| 8,543,244 | B2 | 9/2013 | Keeling |
| 8,600,561 | B1 | 12/2013 | Modi |
| 8,630,742 | B1 | 1/2014 | Stefanski |
| 9,091,453 | B2 | 7/2015 | Matsuoka |
| 9,410,713 | B2 | 8/2016 | Lau |
| 9,519,295 | B2 | 12/2016 | Burton |
| 9,534,805 | B2 | 1/2017 | Matsuoka et al. |
| 10,047,969 | B2 | 8/2018 | Lau |
| 10,066,849 | B2 | 9/2018 | Lau |
| 10,119,719 | B2 | 11/2018 | Lau |
| 2003/0223172 | A1 | 12/2003 | Priest |
| 2004/0217182 | A1 | 11/2004 | St. Jean |
| 2005/0150651 | A1 | 7/2005 | Halsey |
| 2007/0057075 | A1 | 3/2007 | Votaw |
| 2007/0262161 | A1 | 11/2007 | Davies |
| 2008/0083834 | A1 | 4/2008 | Krebs |
| 2009/0001179 | A1 | 1/2009 | Dempsey |
| 2010/0187318 | A1 | 7/2010 | Yu |
| 2011/0234368 | A1 | 9/2011 | Huang |
| 2012/0104108 | A1 | 5/2012 | Westberg et al. |
| 2012/0232969 | A1 | 9/2012 | Fadell |
| 2012/0233478 | A1 | 9/2012 | Mucignat |
| 2012/0248211 | A1 | 10/2012 | Warren et al. |
| 2013/0090767 | A1 | 4/2013 | Bruck |
| 2013/0211783 | A1 | 8/2013 | Fisher |
| 2013/0255297 | A1 | 10/2013 | Matsuoka |
| 2014/0058806 | A1 | 2/2014 | Guenette |
| 2015/0060038 | A1 | 3/2015 | Lau |
| 2015/0060657 | A1 | 3/2015 | Lau |
| 2015/0159905 | A1 | 6/2015 | Lau |
| 2015/0204571 | A1* | 7/2015 | Messmer ............... F24F 13/10 454/256 |
| 2016/0223219 | A1 | 8/2016 | Lau |
| 2016/0245544 | A1 | 8/2016 | Walsh |
| 2017/0051925 | A1 | 2/2017 | Stefanski |
| 2017/0051936 | A1 | 2/2017 | Lau |
| 2018/0038611 | A1 | 2/2018 | Lau |

OTHER PUBLICATIONS

Carrier Corporation, "48ES-A Comfort 13 SEER Single-Packaged Air Conditioner and Gas Furnace System with Puron® ®-410A) Refrigerant Single and Three Phase 2-5 Nominal Tons (Sizes 24-60), 48ES-A Installation Instructions," Date: Sep. 2010, pp. 36. Published by Carrier Corporation, 7310 W. Morris St. D, Indianapolis, IN 46231, USA. Available online at: http://dms.hvacpartners.com/docs/1009/Public/OE/48ES-05SI.pdf.

Lux Products Corporation, "Power Bridge Installation" provides 24V AC power to thermostats in homes without C-wires. allows homes with 3 and 4 wire systems to use smart thermostats without requiring a new wire to be installed between furnace and thermostat. Date Jun. 2017. pp. 2. Published by LUX Products Corporation, 4747 S Broad St #330, Philadelphia, PA 19112 USA. See https://pro.luxproducts.com/powerbridge/.

Honeywell International Inc., "Electro-Mechanical Wiresaver THP9045A1023/U Wiring Module" for Honeywell thermostats is a C-Wire Adapter for Wi-Fi thermostats or RedLINK 8000 series Honeywell thermostat models. Date: Dec. 2010. pp. 12. Published by Honeywell Limited, 35, Dynamic Drive, Toronto, Ontario M1V 4Z9 Canada. See https://customer.honeywell.com/en-US/Pages/Product.aspx?cat=HonECC+Catalog&pid=thp9045a1023/U.

Florida Solar Energy Center (FSEC) authored by Henderson, H., Shirey, D., Raustad, R., "Understanding the Dehumidification Performance of Air-Conditioner Equipment at Part-Load Conditions," Final Report FSEC-CR-1537-05, Date: Jan. 2006. pp. 613, Published by FSEC, 1679 Clearlake Rd, Cocoa, FL 32922 USA. See http://www.fsec.ucf.edu/en/publications/pdf/FSEC-CR-1537-05.pdf.

Ecobee Inc. "EBPEK01 Smart SI Power Extender Kit" provides common wire for 5-wire thermostats if only 4 wires are available at existing thermostat. Date: Apr. 2013. pp. 2. Published by Ecobee Inc., Toronto, Canada. See https://support.ecobee.com/hc/en-us/articles/360009166051-Installing-your-ecobee-thermostat-with-the-Power-Extender-Kit-no-C-wire-.

Venstar Inc. "Add-a-Wire#" In applications where additional wiring cannot be installed, the Add-A-Wire accessory can be used to add a wire to the thermostat. Date: Feb. 2012. pp. 4. Published by Venstar Inc., 9250 Owensmouth Ave, Chatsworth, CA 91311 USA. See https://venstar.com/thermostats/accessories/add-a-wire/.

Honeywell International Inc., "JADE™ Economizer Module (Model W7220)" Date: Mar. 2014. pp. 32. Published by Honeywell Home

(56) References Cited

OTHER PUBLICATIONS and Building Technologies, 715 Peachtree Street NE, Atlanta, GA 30308 USA. See https://customer.honeywell.com/resources/techlit/TechLitDocuments/63-0000s/63/2700.pdf.

Queen, Robert San Diego State University Research Foundation. 2013. Energy Innovations Small Grant Program: 2006 Independent Assessment Reports. California Energy Commission. Publication No. CEC-500-2014-070.

Proctor Engineering Group. Oct. 2009. Unpublished Report Concept 3 Furnace Fan Motor Upgrade.

Pacific Gas & Electric Company. Mar. 2007. Published Report Prepared by Proctor Engineering Group. Hot Dry Climate Air Conditioner Pilot Field Test. Emerging Technologies Application Assessment Report #0603.

Pacific Gas and Electric Company. Feb. 2008. Published Report Prepared by Proctor Engineering Group. Hot Dry Climate Air Conditioner Pilot Field Test Phase II. Emerging Technologies Program Application Assessment Report #0724.

T. McElwain, Feb. 2011. Troubleshooting Intermittent Ignition System for Gas Furnaces & Boilers. Gas Training Institute.

ICM Controls Instructions.

California Energy Commission (CEC) Published Report No. CEC-500-2008-056. Buntine, C., Proctor, J., and Knight R. 2006 2007 Energy Performance of Hot Dry Air Conditioning Systems.

Southern California Edison, Proctor Engineering Group, Ltd., Bevilacqua-Knight, Inc., Energy Performance of Hot Dry Air Conditioning Systems, Date: Jul. 2008. pp. 128, California Energy Commission (CEC), Sacramento, CA, USA.

Proctor Engineering Group, Ltd., Hot Dry Climate Air Conditioner Pilot Field Test, Emerging Technologies Application Assessment Report #0603, Date: Mar. 2, 2007, pp. 41, Pacific Gas & Electric Company (PG&E), San Francisco, CA, USA.

Proctor Engineering Group, Ltd., Hot Dry Climate Air Conditioner Pilot Field Test Phase II, Emerging Technologies Program Application Assessment Report #0724, Date: Feb. 8, 2008, pp. 39, Pacific Gas & Electric Company (PG&E), San Francisco, CA, USA.

Conant A., Proctor, A., Elberling, L., Field Tests of Specially Selected Air Conditioners for Hot Dry Climates, Published in the Proceedings of the 2008 ACEEE Summer Study on Energy Efficiency in Buildings, Asilomar, California, Date: Aug. 2008, pp. 14, American Council for an Energy Efficient Economy (ACEEE), Washington, DC, USA.

Proctor Engineering Group Ltd., Concept 3™ Furnace Fan Motor Upgrade, Date: Oct. 1, 2009, pp. 14, Published by Proctor Engineering Group Ltd., 65 Mitchell Blvd Ste 201, San Rafael, CA 94903, USA.

MARS Inc., Series 325 MARS solid state timers, MARS No. 32393 and 32378, Date: Sep. 4, 2007, pp. 1, Motors & Armatures, Inc. (MARS), 250 Rabro Drive East, Hauppauge, NY 11788, USA.

ICM Controls Inc., ICM 254 Post Purge Timers, Date: Oct. 2, 2007. pp. 1, ICM Controls Inc., 6333 Daedalus Drive, Cicero, N.Y. 13039, USA.

Proctor Engineering Group Ltd., California Air Conditioner Upgrade—Enhanced Time Delay Relay—Residential, Work Paper WPPEGPGE0001, Date: May 18, 2008, pp. 15, Published by Proctor Engineering Group Ltd., 65 Mitchell Blvd. Suite 201, San Rafael, CA 94903, USA.

Proctor, J. Fan Controller for Extracting Evaporative Cooling from an Air Conditioning System, Date: Feb. 4, 2008, pp. 2, Electronic Filing Receipt for USPTO Provisional Patent Application No. 61026058, John Proctor, 415 Mission Ave., San Rafael CA 94901, USA.

Proctor Engineering Group Ltd., Workpaper Extended Fan Time Delay Relay, Date: Feb. 9, 2007, pp. 7, Published by Proctor Engineering Group Ltd., 418 Mission Ave., San Rafael, CA 94901 USA.

Proctor Engineering Group Ltd., CheckMe!® Concept 3—Brush Free DC by McMillan Installation Instructions, Date: Dec. 31, 2008, pp. 7, Published by Proctor Engineering Group Ltd., 418 Mission Ave., San Rafael, CA 94901 USA.

Energy Federation Inc., Promo—Concept 3 High Efficiency Motor, Date: Jan. 21, 2009, pp. 3, Published by Energy Federation Inc., 40 Washington St, Westborough, MA 01581 USA.

Proctor Engineering Group Ltd., Promo—Concept 3 PEG Calif—Photo, Date: Dec. 31, 2008, p. 1, Published by Proctor Engineering Group Ltd.; 418 Mission Ave., San Rafael, CA 94901, USA.

Proctor Engineering Group Ltd., Enhanced Time Delay Relay Installation Procedure, Date: Nov. 28, 2006, pp. 2, Published by Proctor Engineering Group Ltd., 418 Mission Ave., San Rafael, CA 94901, USA.

Proctor Engineering Group Ltd., Air Conditioner Enhanced Time Delay Relay (DelayRelayFactSheet 3-LR.pdf), Date: Dec. 31, 2007, pp. 2, Published by Proctor Engineering Group Ltd., 418 Mission Ave., San Rafael, CA 94901, USA.

Conant, A., Proctor Engineering Group, Ltd., California Climate Air Conditioner Upgrade—Enhanced Time Delay Measure Codes H796 Cooling Optimizer Program, Work Work Paper PGE3PHVC150 Enhanced Time Delay Relay Revision #1, Date: May 5, 2014, pp. 36, Published by PG&E Customer Energy Solutions, San Francisco, CA, USA Available online at: http://deeresources.net/workpapers.

California Utilities Statewide Codes and Standards Team, Codes and Standards Enhancement (CASE) Initiative: Residential Refrigerant Charge Testing and Related Issues, 2013 California Building Energy Efficiency Standards, Date: Dec. 2011, pp. 51-61, Published by Pacific Gas and Electric (PG&E) Company, San Francisco, CA, USA.

Proctor, J., Hairrell, A., An Innovative Product's Path to Market. The influence of laboratory and field evaluations on adoption and implementation, Date: Aug. 2013, pp. 7-8, Published by the International Energy Program Evaluation Conference (IEPEC), Chicago, IL, USA.

Southern California Edison, "SCEData.xls," embedded Excel workbookRef2 on p. 28 of PG&E 2014 (Reference 16), Date: Dec. 5, 2007, pp. 5, Pacific Gas and Electric (PG&E) Company, San Francisco, CA, USA Available online at: http://deeresources.net/workpapers.

* cited by examiner

FAULT DETECTION DIAGNOSTIC VARIABLE DIFFERENTIAL VARIABLE DELAY THERMOSTAT

CROSS-REFERENCE TO RELATED APPLICATIONS

The present application is a Continuation In Part of U.S. patent application Ser. No. 15/614,600 filed Jun. 5, 2017, which application is incorporated in its entirety herein by reference.

BACKGROUND OF THE INVENTION

Field of the Invention

This invention relates to Heating, Ventilating Air Conditioning (HVAC) systems. More specifically, this invention relates to a method or apparatus for controlling an HVAC system and a ventilation fan.

Description of the Related Art

Known thermostats control HVAC systems to maintain thermal comfort conditions at a setpoint temperature typically within a fixed tolerance of plus or minus 1 degree Fahrenheit (° F.) by circulating cool or warm air to a conditioned space. The tolerance is referred to as an operating differential or hysteresis. Some thermostats allow the user to manually adjust the hysteresis from a default hysteresis setting of 1° F. to a different fixed differential setting of either 1.5 or 2° F. If the user manually adjusts the differential, it is then fixed until the user manually adjusts the hysteresis again. Thermostats controlling direct-expansion cooling systems typically turn ON the fan at the same time the cool source is energized and turn OFF the fan at the same time the cool source is de-energized. Similarly, thermostats controlling electric, hydronic, and Heat Pump (HP) heating systems typically turn ON the fan when the heat source is energized and turn OFF the fan when the heat source is de-energized, or provide a fixed fan-off delay of 30 to 120 seconds. Thermostats controlling gas furnaces typically provide a heating signal to the furnace, and the furnace fan controller provides a temperature or fixed fan-on time delay after the furnace has been turned ON, to allow time to energize the combustion fan and circulate air to clear the combustion chamber prior to igniting the burner. Typical furnace controllers also provide a temperature or fixed fan-off time delay after the furnace has been turned OFF to recover some of the heating energy stored in the heat exchanger. The temperature-based fan delays either use bimetal switches or temperature sensors to turn on the fan when air leaving the heat exchanger is hot or turn off the fan when air leaving the heat changer is cool. Some thermostats provide the user with an option to manually enter a fixed fan-off time delay for cooling or heating.

Some known prior art thermostats provide a fixed fan-off delay based on user settings. At least one known prior art thermostat turns off the Air Conditioning (AC) compressor prior to satisfying the cooling thermostat setpoint temperature and continues energizing a fan relay to operate the HVAC fan after the AC compressor is turned off for a "fan cooling" time until: (1) the temperature reaches the a predetermined Lower Mean Band Temperature (LMBT) differential; (2) the temperature increase above a predetermined upper limit equal to the fan cooling start temperature plus a small predetermined fixed value; (3) the fan cooling time limit expires (where the fan cooling time limit is equal to an expected fan cooling time plus a fixed value; or (4) the fan cooling reaches a maximum time limit (e.g. 10 minutes). The predetermined upper limit temperature increase is a fixed value (i.e., 0.1° F.) such that fan cooling stops if the current temperature either drops below the LMBT, or the current temperature increases more than the fixed value above the fan cooling starting temperature. When at least one of the four conditions is met then fan cooling is stopped. The prior art does not disclose any method for a variable fan-off delay for heating. Nor does the prior art base the variable fan-off delay for cooling on the temperature measured during the current variable fan-off delay period compared to temperature measurements monitored during the current variable fan-off delay period.

PRIOR ART

Venstar Inc. makes a residential thermostat model T7900 that provides a user input to select a fixed fan-off delay from 0 to 120 seconds (p. 59). "Runs the fan for a short time after Cooling or electric strip heat turns off to increase system efficiency. (0-120 Secs.)" The Venstar T7900 manual provides the following instructions for a heat pump (page 77). "When the GAS/EL or HP dip switch is configured for HP, this dip switch (O or B) must be set to control the appropriate reversing valve. If O is chosen, the W1/O/B terminal will energize in cooling. If B is chosen, the W1/O/B terminal will energize in heating." Known thermostats such as the Venstar T7900 provide a user selectable fixed fan-off delay (page 59). "Fan Off Delay (Os) Runs the fan for a short time after Cooling or electric strip heat turns off to increase system efficiency. (0-120 Secs.)" The Venstar T7900 manual provides no information regarding the HP reversing valve signal status during a fixed fan-off delay. See https://files.venstar-.com/thermostats/colortouch/documents/T7900_OM_Install_FINAL.pdf.

Nest Inc., a subsidiary of Google Inc., makes a thermostat that provides an "Air Wave" function that turns off the AC compressor before reaching the thermostat cooling setpoint and operates the fan alone to attempt to reach the thermostat setpoint if the "interior humidity falls below a certain level." See https://nest.com/support/article/What-is-Airwave. The Nest website provides the following information regarding how "Air Wave" works. See https://nest.com/support/article/What-is-Airwave#how-it-works.

"Airwave learns exactly how much cooling can be done with the compressor off. It automatically shuts off your compressor at the right time to help maximize your savings. Your Nest thermostat automatically turns on Airwave when interior humidity falls below a certain level. This level is calculated by Nest to be optimal for your home. When airwave actives you'll see a blue swirl on your thermostat's display. While Airwave requires the humidity level inside your home to be relatively low, it may still turn on if it's humid outside. This is especially true if your home is relatively new and well-insulated. If it's very humid in your home, your Nest thermostat won't use Airwave and will run your system's compressor for the entire cooling cycle to prioritize lowering the humidity and helping to prevent mold."

As described above, the Nest "Air Wave" method is based on relative humidity and if it is very humid, the Nest thermostat will not use "Air Wave" and instead use the air conditioning compressor for the entire cooling cycle. The Nest "Air Wave" method is only enabled before the AC compressor has satisfied the cooling thermostat setpoint and before a maximum amount of water vapor has condensed on the evaporator coil to provide the maximum amount of evaporative cooling. Furthermore, the Nest thermostat does not provide a fan-only heating method.

The Matsuoka U.S. Pat. No. 9,534,805 ('805) assigned to Google Inc., describes a system and method for controlling fan-only cooling where a first phase of a first cooling cycle may be initiated in an enclosure using an air conditioning system having a compressor and a fan that passes air over an evaporator coil. The first phase may include activation of the compressor and activation of the fan. A relative humidity may be measured within the enclosure during the first phase of the first cooling cycle. Subsequent to the first phase and in response to the relative humidity being determined to be below a threshold relative humidity, a second phase of the first cooling cycle may be initiated during which the fan is activated but the compressor is not activated (i.e., fan cooling). The Matsuoka '805 Column 19 lines 36:49 states:

"In step 840 the backplate measures and logs the temperature, and fan cooling continues until: (1) the temperature reaches the LMBT; (2) the temperature rises above an upper limit (=fan cooling start temp+a small fixed value); (3) the fan cooling time limit 40 expires (=expected fan cooling time+a fixed value, Δtemp2) or (4) the fan cooling reaches a maximum time limit (e.g. 10 minutes). In one example, it has been found that 0.1° F. is a suitable value for Δtemp2 such that fan cooling stops if the current temperature either drops below LMBT, or if the current temperature increases more than 0.1° F. above the fan cooling starting temperature. When at least one of the four conditions is met then in step 844 the backplate wakes the head unit and fan cooling is ceased."

Matsuoka '805 thus discloses four methods to turn off fan-cooling: 1) when thermostat temperature reaches the Lower Mean Band Temperature (LMBT), 2) when thermostat temperature increases above an upper limit (=fan cooling start temp plus a small fixed value), 3) when the fan-cooling time limit expires and 4) when fan cooling reaches a maximum time limit of 10 minutes.

The Matsuoka WO 2013/149160 abstract further discloses:

"The duration of the fan cooling period is adjusted based on temperature measurements made during the previous cooling cycle that ended with fan cooling."

Matsuoka WO 2013/149160 page 23 lines 27-28 and page 24 lines 1-2 and Matsuoka '805 Col. 15 lines 33-37 disclose:

"In particular, according to some embodiments, an expected temperature drop due to fan cooling and an expected amount of time to achieve that drop are estimated from measurements of one or more prior cooling cycles."

As noted above, the Matsuoka '805 fan cooling only occurs after early compressor turn-off and the upper limit temperature increase is a fixed value (i.e., 0.1° F.) such that fan cooling stops if the current temperature either drops below the LMBT, or the current temperature rises more than the fixed value above the fan cooling starting temperature, or the maximum fan cooling time limit has expired. When at least one of the four conditions is met, then fan cooling is ceased. The Matsuoka '805 early AC compressor turn-off method attempts to achieve the thermostat call for cooling with fan cooling only and this might cause short cycling during periods of hot weather where the method does not satisfy the thermostat call for cooling and cycles on and off intermittently or where the method might be disabled by occupants, or the method might not function at all depending on AC compressor operational time limits and relative humidity conditions described in column 2 lines 17-24.

"According to some embodiments, the initiation of the second phase does not occur unless a predetermined time limit has elapsed, such that sufficient condensation is allowed to form on the evaporator coil during the first phase. According to some embodiments the initiation of the second phase does not occur unless relative humidity within the enclosure is below a predetermined threshold, which in some examples is set between 45 and 60 percent relative humidity."

The Matsouka '805 "small fixed value" of 0.1° F. doesn't vary and doesn't provide sufficient control for all cooling conditions. Furthermore, the Matsuoka '805 does not disclose any method for a variable fan-off delay for heating. Nor does Matsuoka '805 disclose a method for determining a variable fan-off delay for cooling on the temperature measured during the current variable fan-off delay period compared to temperature measurements monitored during the current variable fan-off delay period. The '805 describes sensors incorporated in the thermostat to detect occupancy, temperature, light and other environmental conditions and influence the control and operation of HVAC system. The '805 does not diagnose whether or not an HVAC fan is accidentally turned "ON" and operating by itself without a call for cooling or heating.

The Parker U.S. Pat. No. 5,996,898 ('898) assigned to University of Central Florida, describes a ceiling fan operation control for turning a ceiling fan on and off based on a passive infrared sensor, combined with a temperature sensor to regulate the speed of the fan. The passive infrared sensor, the temperature sensor and controls for both are in a housing directly mounted to the fan motor of the ceiling fan. The '898 is not embodied in a thermostat and does not determine if an HVAC system is operating in cooling or heating mode. Nor does the '898 diagnose whether or not an HVAC fan is accidentally turned "ON" and operating by itself without a call for cooling or heating.

The Keating U.S. Pat. No. 5,544,809 ('809) assigned to Senercomm, Inc., provides an apparatus and methods to control an HVAC system for enclosed areas. Selected internal environmental variables in an enclosed area are measured including data from a motion sensor indicating an occupancy status of the area for automatically controlling the operation of the HVAC system. Control settings are made to meet desired temperature and energy consumption levels. A logic algorithm and microcomputer determine humidity levels. The humidity levels are controlled to minimize the occurrence of mold and mildew. Algorithm timing strategies optimize air drying initiated by an occupancy sensor. The '809 is embodied in a thermostat to reduce indoor humidity, but does not diagnose whether or not an HVAC fan is accidentally turned "ON" and operating by itself without a call for cooling or heating.

The Chapman et al. U.S. Pat. No. 7,469,550 ('550) is an energy saving control for appliances via an intelligent thermostat that provides programmatic control over the HVAC system, and provides coordinated control over the appliances via a communications network between the thermostat and appliances. The appliances include occupancy sensors and transmit usage and occupancy information to the thermostat. The thermostat processes this information to determine the occupancy of the dwelling. The thermostat controls the HVAC system and the appliances according to the determined occupancy of the dwelling. The '550 does not diagnose whether or not an HVAC fan is accidentally turned "ON" and operating by itself without a call for cooling or heating.

The Lutron occupancy sensor wall switch model MS-OPS5M can be used to turn on the lights or an exhaust fan "ON" when occupants enter a room and turn "OFF" the lights or an exhaust fan when the room is vacant. The Lutron wall switch has not been used to control an HVAC fan or to diagnose whether or not an HVAC fan is accidentally turned "ON" and operating by itself without a call for cooling or heating. See http://www.lutron.com/TechnicalDocumentLibrary/3672236_Sensor_Spec_Guide.pdf The Amundson et al. U.S. Patent Application Publication No. US 2005/0119766A1 ('766) discloses a method of modifying a programmable schedule for a controller providing two or more schedule override choices via a user interface that includes a circulate fan over-ride function. The fan over-ride function can be used to turn on a fan continuously increasing the duty cycle of the fan, or otherwise causing increased (or decreased) fan circulation in the inside space. In one embodiment (shown in FIG. 11), the HVAC interface may request a time period for how long the fan over-ride function should be maintained. The user may input a time period, such as 4 hours. After the time period expires, the system may return to the normal programmed schedule, if desired. This may allow a user to increase/decrease fan circulation in an inside space for a period of time. The '766 does not diagnose whether or not an HVAC fan is accidentally turned "ON" and operating by itself without a call for cooling or heating and does not vary the time period based on HVAC parameters.

The Amundson U.S. Pat. No. 7,634,504 discloses controllers and methods for programming configuration information including an interview question generator adapted to generate questions relating to the installation or setup of the controller and/or one or more components controlled by the controller, a user interface including a display screen adapted to display interview questions to a user along with at least two answers for each interview question, and a memory unit for storing operational parameters of the controller based at least in part on user responses to the interview questions.

The Metz at al. U.S. Pat. No. 7,142,948 discloses a controller including a programmable schedule and a user interface, adapted and configured to illustratively display at least a portion of the programmable schedule along a time axis and a current time indicator positioned to indicate the current time along the time axis. A method is also described including the steps of: operating a programmable controller having a scheduled current set point and a scheduled future set point; and providing a message indicating a time of the scheduled future set point change.

The Bohrer et al. U.S. Pat. No. 6,975,958—discloses a method for adjusting a plurality of controlled subsystems in a building or plant that facilitates cooperative energy usage with a utility provider. By referring to a single profile of adjustments that correspond to changes in the value of a utility signal and distributing this to each relevant controller for each subsystem, a single setback delta can be applied to each subsystem for each change in utility signal value (i.e., pricing information). Alternatively, multiple profiles can be used to provide for firmer control and thereby allow for different zones to respond differently to a single change signal sent by the utility provider.

The Tienhou U.S. Pat. No. 5,833,134 discloses a wireless remote temperature sensing and control thermostat system for regulating air ducted air conditioning systems incorporating a normal mode and a remote control mode, including a combination thermostat and radio-frequency receiver unit, a radio-frequency transmitter, and an adjustable register. In the normal mode, a reference temperature is set by the thermostat for the temperature throughout the entire air conditioned structure. In the remote control mode, the local temperature sensing and control functions of the thermostat are disabled and the transmitter unit will take over the temperature sensing at the remote site which, in turn, then will control the thermostat unit. As a result, the users will be able to more accurately control their own personal environment.

The Lombard et al U.S. Patent Application Publication No. 2012/00055930 assigned to Ecobee Inc. discloses a system and method for an environment control and energy management including a server computer, at least one environment control device (ECD) and at least one mobile device communicatively coupled via a web-based communication system. A mobile device, also having a touch screen display, may be configured to display a replica screen of the touch screen user interface of the ECD, and allows modification of the control program accessed at the ECD.

The Niculescu et al. U.S. Patent Application Publication No. 2018/0149381 ('381) assigned to Ecobee Inc. discloses a control device, such as a smart thermostat, employing solid state relays as switches to activate and deactivate systems controlled by the device. Current flows through at least some of the solid state relays are monitored to determine the bulk heating produced in the solid state relays, and their associated circuitry and printed circuit board traces, and this determined amount of bulk heat is added to other determined amounts of bulk heat and is used to compensate the reading provided by temperature sensors within the control device which have been affected by the bulk heat. Further, by measuring the current flow through the power buses to one or more of the solid state relays of the control device, potentially damaging over current conditions can be distinguished from permissible transient over-current conditions and the control device can deactivate any solid state relays which would be damaged while allowing solid state relays which are experiencing allowable transients to remain operating. In the case of a severe over current condition, a current monitoring device can issue a fault signal, triggering an interrupt condition which will cause a processor in the controller to shut down the affected solid state relays very quickly.

U.S. Pat. No. 4,684,060 (Adams '060) discloses a furnace fan control using a separate fan relay not integral to the furnace assembly and a timing circuit receiving a "burner on signal" produced when a thermostat, or some other circuit, senses burner operation and closes (which is delayed until 40 to 180 seconds after thermostat call for heating). The "burner on" signal is generally inaccessible by technicians and cannot be monitored from thermostat or equipment terminals. The thermostat W terminal signal used to measure heat source operational time, is the only signal accessible in a heating system or thermostat that provides a consistent measurement of heating system operational time for different manufacturers and models. The "burner on" time is significantly different from the thermostat W control signal defined from when the thermostat is initiating a call for heating until when the thermostat is terminating the call for heating. When the thermostat calls for heating, the thermostat W terminal control signal is energized followed by a pre-purge inducer blower that operates for 15 seconds or more to circulate air and purge the combustion chamber of gas. The inducer blower closes a pressure switch to energize the hot-surface ignitor and open the gas valve to ignite the burner which takes 17 seconds or more. The trial-for-ignition sequence proves the burner has ignited and takes 7 to 21 seconds or more and flame proving takes 2 seconds or more. The Gas Training Institute cites the following times for proving and starting the "burner on" time by various manufacturers of furnace controllers: Honeywell 90 to 180 seconds, Robertshaw 60, 90 or 120 seconds, White-Rodgers 90 seconds, and Penn-Johnson up to 120 seconds (T. McElwain. Feb. 28, 2011. Troubleshooting Intermittent Ignition Systems for Gas Furnaces and Boilers. Gas Training Institute. pp. 1-6. https://heatinghelp.com/assets/documents/Troubleshooting-Intermittent-Ignition-Systems-for-Gas-Furnaces-and-Boilers.pdf).

Therefore, the Adams '060 "burner on time" is significantly different from the duration of time when the thermostat is calling for heating defining a heating system operating time. The Adams '060 patent discloses a fixed fan-off time delay of 2 minutes based on 0 to 2 minutes of burner operation, a fan-off time delay of 2 to 4 minutes based on 2 to 4 minutes of burner operation, and a fixed fan-off time delay of 4 minutes for all burner operational times greater than 4 minutes. The fan-off time delay of Adams '060 is based on the principle that all of the available stored heat in the system is present when the heat exchanger reaches operational temperature (Adams '060 assumes this requires 4 minutes of operation), and no additional stored heat accumulated after the heat exchanger reaches operational temperature. For furnace operation less than 4 minutes, Adams '060 wastes fan energy and causes thermal comfort issues by circulating unwarmed air into the conditioned space before the heat exchanger is hot enough to provide satisfactory operating temperatures. Gas furnaces generally require at least 4 minutes of time for the heat exchanger to warm up and reach an operational temperature unless there is a fault causing short-cycling such as a blocked air filter or cracked heat exchanger. Therefore, Adams '060 effectively only provides a fixed-fan-off time delay of 4 minutes since all furnaces require at least 4 minutes of time to reach operating temperature and store enough heat to support a longer fan-off time delay.

U.S. Pat. No. 6,684,944 (Byrnes et al, 2004) and U.S. Pat. No. 6,695,046 (Byrnes et al, 2004) disclose a variable speed fan motor control for forced air heating/cooling systems using an induction-type fan motor controlled by a controller circuit which is operable to continuously vary the speed of the fan motor during a start-up phase and a shut-down phase of the heating and/or cooling cycle. The controller circuit includes temperature sensors which are operable to control start-up and shutdown of the fan motor over continuously variable speed operating cycles in response to sensed temperature of the air being circulated by the fan. Byrnes teaches control of the heater fan from low to high speed but the high speed is limited specifically to the motor speed used for heating which is low, medium, or medium high and not the motor's high speed used for cooling. Byrnes' patents do not include a method or a fan relay to energize the high speed used for cooling after a short time period when the heat exchanger has reached its maximum temperature to deliver more heating output to satisfy the thermostat temperature sooner and save heat source energy. Byrnes' does not teach a variable fan-off time delay based on AC compressor or heat source operational time.

Non-patent publication published by SOUTHERN CALIFORNIA EDISON and authored by PROCTOR ENGINEERING GROUP, LTD., BEVILACQUA-KNIGHT, INC., "Energy Performance of Hot Dry Air Conditioning Systems," Report Number CEC-500-2008-056, July 2008, Pages 15, 50, 65-66, California Energy Commission, Sacramento, Calif. USA (CEC '056). Available online at: http://www.energy.ca.gov/2008publications/CEC-500-2008-056/CEC-500-2008-056.PD F. Pages 65 and 66 of the CEC '056 non-patent publication provides laboratory test data performed by Southern California Edison (SCE) of a latent recovery method where the fan operates continuously and the compressor is paused or turned off intermittently which is referred to as a Compressor Pause Mode (CPM) on page 2 of the PG&E #0603 non-patent publication discussed below. CEC '056 describes the latent recovery method as "cooling energy . . . stored as moisture removal" which "will be lost down the condensate drain unless it is recovered at the end of the compressor cycle."

Non-patent publication published by PACIFIC GAS & ELECTRIC (PG&E) and authored by PROCTOR ENGINEERING GROUP, LTD., "Hot Dry Climate Air Conditioner Pilot Field Test," Emerging Technologies Application Assessment Report #0603. Date: Mar. 2, 2007, Pages 41, Pacific Gas & Electric (PG&E) Company, San Francisco, Calif., USA (PG&E #0603). Available online at: http://www.etcc-ca.com/reports/hot-dry-climate-air-conditioner-pilot-field-test. The PG&E #0603 non-patent publication discloses two latent recovery methods: 1) Compressor Pause Mode; and 2) optimal fixed fan-off delays for different climate zones with high, medium, or low speed fan during the fan-off delays. Variable speed fan motor operation during fan-off delays was disclosed by Byrnes in U.S. Pat. No. 6,684,944 issued on Feb. 3, 2004 and U.S. Pat. No. 6,695, 046 issued Feb. 24, 2004.

Non-patent publication published by PACIFIC GAS & ELECTRIC (PG&E) and authored by PROCTOR ENGINEERING GROUP, LTD., "Hot Dry Climate Air Conditioner Pilot Field Test Phase II, Emerging Technologies Program Application Assessment Report #0724," Date: Feb. 8, 2008, Pages 39, PG&E Company, San Francisco, Calif., USA, (PG&E #0724). Available online at: https://newbuildings.org/sites/default/files/PGE_2008_Pilot_Field_Test_Report.pdf. The PG&E #0724 non-patent publication discloses optimal fixed fan-off delays for various AC operating times in different climate zones where the fan is operated at high, medium, or low speed fan operation during the fan delay using a variable speed Electronically Commutated Motor (ECM). Variable speed fan motor operation during fan-off delays was disclosed by Byrnes in U.S. Pat. No. 6,684,944 issued on Feb. 3, 2004 and U.S. Pat. No. 6,695,046 issued Feb. 24, 2004.

Non-patent publication published by American Council for an Energy Efficient Economy (ACEEE) and authored by ABRAM CONANT, JOHN PROCTOR, LANCE ELBERLING, "Field Tests of Specially Selected Air Conditioners for Hot Dry Climates," Published in the Proceedings of the 2008 ACEEE Summer Study on Energy Efficiency in Buildings, Asilomar, Calif., Date: August 2008, Pages 14, American Council for an Energy Efficient Economy, 529 14th Street NW, Suite 600, Washington, D.C. 20045 USA (Conant 2008). Available online at: http://aceee.org/files/proceedings/2008/data/papers/1_537.pdf. The Conant 2008 non-patent publication discloses potential energy efficiency improvements from fixed fan-off time delays for various air conditioning operating times using a variable-speed brushless DC fan motor to operate the fan at a lower speed during the fan-off delay. Variable speed fan motor operation during fan-off delays was disclosed by Byrnes in U.S. Pat. No. 6,684,944 issued on Feb. 3, 2004 and U.S. Pat. No. 6,695, 046 issued Feb. 24, 2004.

Non-patent unpublished report authored by PROCTOR ENGINEERING GROUP, LTD., "Concept 3™ Furnace Fan Motor Upgrade," Prepared by Proctor Engineering Group. Date: Oct. 1, 2009. Pages 14. Published by Proctor Engineering Group Ltd., 65 Mitchell Blvd Ste 201, San Rafael, Calif. 94903. (Proctor 2009). The Proctor 2009 unpublished report discloses a method of controlling a variable speed fan motor to provide a cooling fan-off delay. Variable speed fan motor operation during fan-off delays was disclosed by Byrnes in U.S. Pat. No. 6,684,944 issued on Feb. 3, 2004 and U.S. Pat. No. 6,695,046 issued Feb. 24, 2004.

Non-patent unpublished report authored by PROCTOR ENGINEERING GROUP, LTD., "California Air Conditioner Upgrade—Enhanced Time Delay Relay—Residential, Work Paper WPPEGPGE0001," Date: May 18, 2008, Pages 15, Provided to me on Oct. 12, 2017 by Proctor Engineering Group Ltd., 65 Mitchell Blvd. Suite 201, San Rafael, Calif. 94903, USA (Proctor 2008). The Proctor 2008 non-patent unpublished report was not disseminated or made available to the extent that persons interested and ordinarily skilled in the subject matter or art, exercising reasonable diligence, could locate the reference. Proctor 2008 describes a cooling fan-off delay Enhanced Time Delay (ETD) product providing a fan-off delay with a variable speed Electronically Commutated Motor (ECM or a fixed speed Permanent Split Capacitance (PSC) motor. Data provided in the Proctor 2008 workpaper are for continuous high speed fan operation and intermittent compressor operation (i.e., variable compressor "ON" and "OFF" times) per the Compressor Pause Mode (CPM) method disclosed on page 21 of the PG&E #0603 and FIG. 48 (p. 66) of CEC '056. Variable fan speed operation during fan-off delays was disclosed by Byrnes in U.S. Pat. No. 6,684,944 issued on Feb. 3, 2004 and U.S. Pat. No. 6,695,046 issued Feb. 24, 2004.

Non-patent unpublished report authored by PROCTOR ENGINEERING GROUP, LTD., "Workpaper Extended Fan Time Delay Relay," Date: Feb. 9, 2007, Pages 7, Prepared by Proctor Engineering Group Ltd., 418 Mission Ave., San Rafael, Calif. 94901 USA (Proctor 2007). Proctor 2007 was not disseminated or made available to the extent that persons interested and ordinarily skilled in the subject matter or art, exercising reasonable diligence, could locate the reference. Data provided in the Proctor 2007 workpaper are for continuous high speed fan operation and intermittent compressor operation per the CPM method disclosed on page 21 of the PG&E #0603 and FIG. 48 (p. 66) of CEC '056. Proctor 2007 suggests that a fixed time delay is optimal (i.e., "5-minute time delay is closer to optimum" and "energy savings for ECM units with low speed are double the PSC savings"). No information is provided in Proctor 2007 to define any relationship between the fan-off delay "tail" and the AC compressor cycle length. Variable fan speed operation during fan-off delays was disclosed by Byrnes in U.S. Pat. No. 6,684,944 issued on Feb. 3, 2004 and U.S. Pat. No. 6,695,046 issued Feb. 24, 2004.

Non-patent unpublished instructions authored by PROCTOR ENGINEERING GROUP, LTD., "CheckMe!® Concept 3—Brush Free DC by McMillan Installation Instructions," Dated: Dec. 31, 2008, Pages 7, Prepared by Proctor Engineering Group Ltd., 418 Mission Ave., San Rafael, Calif. 94901 USA (Proctor 2008a). The Proctor 2008a installation manual is currently available online at: https://www.proctoreng.com/dnld/Concept3_Installation_forCM.pdf. However, the Proctor 2008a was not disseminated or made available to the extent that persons interested and ordinarily skilled in the subject matter or art, exercising reasonable diligence, could locate the reference. Concept 3 motor installation manual describes a variable speed fan motor operating at low speed during fan-off delay. Variable fan speed operation during fan-off delays was disclosed by Byrnes in U.S. Pat. No. 6,684,944 issued on Feb. 3, 2004 and U.S. Pat. No. 6,695,046 issued Feb. 24, 2004.

U.S. Pat. No. 6,708,135 (Southworth '135) describes several timer functions (e.g. delay on make, delay on break, recycle, single shot, etc.) expressed in terms of a series of timer subfunctions, and code segments for each subfunction. A program of a timer is established to include a plurality of subfunction code segments and a subfunction ordering table for determining the ordering of execution for the subfunction code segments. The ordering of subfunctions of the subfunction ordering table may be selectable in accordance with a model number input received at a program builder system adapted for use in programming the programmable timer. In one embodiment, the programming method provides for reprogramming of a timer including a control circuit having a one-time programmable processor.

Non-patent publication published by PACIFIC GAS & ELECTRIC (PG&E) and authored by Abram Conant of PROCTOR ENGINEERING GROUP, LTD., titled "California Climate Air Conditioner Upgrade—Enhanced Time Delay Measure Codes H796 Cooling Optimizer Program, Work Paper PGE3PHVC150 Enhanced Time Delay Relay Revision #1," Date: May 5, 2014, pages 36, published by PG&E Customer Energy Solutions, San Francisco, Calif., USA (PG&E 2014). Available online at: http://deeresources.net/workpapers. PG&E 2014 was published 48 months after the Walsh Provisional Application No. 61/324,229 ('229) was filed on Apr. 14, 2010 which issued as U.S. Pat. No. 8,763,920 ('920). PG&E 2014 is the earliest published Proctor workpaper available that can be located by persons interested and ordinarily skill in the subject matter or art, exercising reasonable diligence. No earlier published references of Proctor workpapers were disseminated or otherwise made available to the extent that persons interested and ordinarily skilled in the subject matter or art, exercising reasonable diligence, could locate the references. PG&E 2014 references an undisclosed proprietary algorithm providing a fan-off delay after the air conditioner compressor turns off. This disclosure of an undisclosed algorithm is almost identical to the disclosure on page 9 of Proctor 2008 regarding an undisclosed proprietary algorithm. PG&E 2014 does not provide an enabling disclosure regarding how "the fan-off time delay is recalculated during every air conditioner cycle as a function of the available cooling capacity remaining on the indoor coil." PG&E 2014 provides field test data for seven homes that "received a device with control characteristics identical to the WCC (ETDR) device" (Table 8, pp. 8-9) from a study published in August 2011 by Queen, R., titled "Proportional Time Delay Relay for Air Conditioner Latent Capacity Recovery," Report to the California Energy Commission Public Interest Energy Research Program, August 2011. The Queen report was published 16 months after Walsh filed the provisional '229 patent application was filed on Apr. 14, 2010 which issued as the '920 patent. PG&E 2014 also provides Intertek laboratory test data from CASE 2011 published in December 2011 or 20 months after the Walsh filed the provisional '229 application on Apr. 14, 2010 which issued as the '920 patent. PG&E 2014 also provides tests of continuous fan operation with Compressor Pause Mode (CPM) in FIG. 5 and Table 11 (p. 13) taken from Table 23 (p. 65) and FIG. 48 (p. 66) of the CEC '056. FIG. 5 (p. 13) and FIG. 48 (p. 66) of the CEC '056 only show the Y-axis from 5.5 to 10. FIG. 5 also shows three arrows pointing to a "5 minute tail" and one arrow pointing to a "10 minute tail," but these are not "enhanced time delay tests" as stated in the caption of FIG. 5. Rather, these are Compressor Pause Mode (CPM) tests as indicated in an embedded Excel spreadsheet titled "SCEData.xls" in PG&E 2014 showing the full lab test data including evaporator fan power and continuous fan operation with compressor pause and the entire Y-axis from 0 to 10 (sensible EER and kW). The CPM method is described on page 21 of PG&E #0603. PG&E 2014 also provides laboratory test data described in Henderson 2006 cited in CEC '056. Henderson 2006 provides data for a fixed fan-off delay of 26 minutes based on AC compressor operating time of 12 minutes.

Non-patent publication published by the CALIFORNIA UTILITIES STATEWIDE CODES AND STANDARDS TEAM, Codes and Standards Enhancement (CASE) Initiative: Residential Refrigerant Charge Testing and Related Issues, 2013 California Building Energy Efficiency Standards, Date: December 2011, pages 51-61, authored by Pacific Gas and Electric (PG&E) Company, San Francisco, Calif., USA (CASE 2011). Available online at: http://www.energy.ca.gov/title24/2008standards/special_case_appliance/refrigerant/2013_CASE_R_Refrigerant_Charge_Testing_Dec_2011.pdf. CASE 2011 was published 20 months after filing the '229 application on Apr. 14, 2010 which issued as the '920 patent. The CASE 2011 discloses a fixed fan-off delay based on variable AC run time or variable fan-off delay based on fixed AC run time. Cycling test summaries are provided in Appendix C (pp. 60-61) for various fan-off time delay times of 80 to 610 seconds with 6 minutes of compressor run times for all tests with one set of tests using a Permanent Split Capacitance (PSC) motor and one set of tests using a Brushless Permanent Magnet (BPM) motor. Appendix A (pp. 50-54) provides Intertek testing conditions, test descriptions, test date, conditions, and airflow (cfm/ton) indicating the test were performed from Sep. 16, 2010 (p. 50) through Oct. 1, 2010 (p. 54). The Intertek tests provided in Appendix A (pp. 50-54), Appendix B (pp. 55-59), and Appendix C (pp. 60-61) were performed approximately five months after Walsh filed the provisional application No. 61/324,229 ('229), filed on Apr. 14, 2010 that led to the Walsh U.S. Pat. No. 8,763,920 ('920). Page 33 and 34 provide laboratory test data regarding the duct loss effect for fan-off time delay times ranging from 80 to 610 seconds with compressor run times of 6 minutes where one set of tests was performed using a PSC motor (FIG. 20) and another set of tests was performed using a BPM motor (FIG. 21).

Non-patent publication published by the International Energy Program Evaluation Conference (IEPEC) and authored by PROCTOR, J., HAIRRELL, A., "An Innovative Product's Path to Market. The influence of laboratory and field evaluations on adoption and implementation," Date: August 2013, pages 7-8, IEPEC, Chicago, Ill., USA (Proctor 2013). Available online at: https://www.iepec.org/conf-docs/conf-by-year/2013-Chicago/050.pdf#page=1. Proctor 2013 was published 40 months after the Walsh '229 application was filed on Apr. 14, 2010 that led to the '920 patent. Proctor 2013 references an undisclosed algorithm embodied in a relay to provide a fan-off delay after air conditioning compressor turns off. Page 8 of the Proctor 2013 report provides the following statement.

"In the [fall of 2010] (sic) various time delay lengths were tested at the psychometric test facility in Plano Tex. This facility is regularly used by air conditioning manufacturers to certify their units to AHRI. The facility consists of a climate controlled indoor room and a climate controlled outdoor room. The facility has the ability to cover a wide range of climate conditions from very hot summer conditions to very cold winter conditions. These tests were sponsored by the California Investor Owned Utilities in support of codes and standards."

The above statement asserts that tests were performed in the "winter of 2009" appears to be a typographical error and is crossed out and substituted with "fall of 2010." Evidence of this typographical error is provided in CASE 2011 Appendix A (pp. 50-54) showing tests dates ranging from Sep. 16, 2010 (p. 50) through Oct. 1, 2010 (p. 54). Furthermore, Robert Mowris, Verified Inc., was the first client to use the new Intertek psychrometric test facility in Plano, Tex., from February through March 2010. The Intertek tests provided in Appendix A (pp. 50-54) of the CASE 2011 report were performed approximately five months after the '229 application was filed on Apr. 14, 2010. The Proctor relay product was labeled with Southworth U.S. Pat. No. 6,708,135. The Southworth '135 patent applies to a timer that has the ability to be field programmed, but does not monitor any inputs nor does the patent vary the fan time delay based on the inputs.

Non-patent installation instructions published by CARRIER CORPORATION for a packaged HVAC system "48ES-A Comfort 13 SEER Single-Packaged Air Conditioner and Gas Furnace System with Puron® ®-410A) Refrigerant Single and Three Phase 2-5 Nominal Tons (Sizes 24-60), 48ES-A Installation Instructions," date: September 2010, Page 23 (CARRIER 2010). Available online at: http://dms.hvacpartners.com/docs/1009/Public/0E/48ES-0551.pdf. CARRIER 2010 discloses a method of changing the fan speed by selecting a fan speed tap on the motor and connecting it to the blower relay.

U.S. Pat. No. 9,410,713 (Lau '713) abstract discloses an "integrated efficient fan controller circuit device for controlling a fan of a heating, ventilating and air conditioning (HVAC) system." Lau '713 describes and claims a fan controller having well-known circuit elements and configurations. Before the filing date of the Lau '713 (Aug. 30, 2013), fan controllers for HVAC systems had already existed. The fan controller disclosed and claimed by Lau, including each of the circuit components and their connections were either known or obvious to a person of ordinary skill based on decades-old circuit theory or disclosed in U.S. Pat. No. 8,763,920 (Walsh '920), issued on Jul. 1, 2014 from an application filed on Apr. 12, 2011 and claiming priority from a provisional application, 61/324,229, filed on Apr. 14, 2010.

U.S. Pat. No. 10,047,969 (Lau '969) (Application Publication No. 2015/0159905) discloses a "method and apparatus for controlling an air handler including a fan and at least a member of a group consisting of a heater and a compressor, the method comprising: installing an energy saving controller ("ESC") between a thermostat and the air handler, monitoring by the ESC of ON and OFF durations of the heater if the air handler is in a heating mode, or the compressor if the air handler is in cooling mode, in a previous cycle and of ON duration of a current cycle, and determining the fan's first run time extension amount based on the ON and OFF durations of the previous cycle and the ON duration of the current cycle."

U.S. Patent Application Publication No. 2015/0060557 (Lau '557) discloses a "method for energy saving during the operation of an HVAC system comprising an energy saving unit,
comprising: installing a temperature probe in the supply air that can send data to the energy saving unit; configuring the energy saving unit to perform a set of functions comprising: receiving a user's instructions for turning on the HVAC system and setting a target room temperature; shutting off the heater or compressor when the target temperature is reached; measuring the temperature of the air in the room that is being heated or cooled and comparing the temperature of the supply air with the temperature of the air in the room; and causing the blower to keep running after shutting off the heater or compressor for as long as the temperature of the air in the room is smaller or greater than the temperature of the supply air, respectively."

U.S. patent application Ser. No. 10/119,719 (Lau '719) (Publication No. 2016/0223219) discloses an "energy saving controller for an air handler having a fan and a heater or a compressor, the energy saving controller having circuitry for monitoring of ON and OFF durations of the heater if the air handler is in a heating mode, or the compressor if the air handler is in a cooling mode, in a previous cycle, and, of ON duration of a current cycle, and determining the fan's first run time extension based on the ON and OFF durations of the previous cycle and the ON duration of the current cycle. Lau '219 was filed Apr. 7, 2016 about five years after the Walsh U.S. patent application Ser. No. 13/085,119 was filed on Apr. 12, 2011 with Provisional Application No. 61/324,229 filed on Apr. 14, 2010 that led to U.S. Pat. No. 8,763,920 (Walsh '920). Walsh '920 discloses "monitoring a duration of the air conditioner compressor cycle; and determining an amount of time fan operation is extended after the cooling cycle based on the duration" where the cooling cycle includes the OFF and ON duration. U.S. Pat. No. 9,995,493 (Mowris '493) is a continuation in part from the Walsh '920. Mowris '493 discloses a heating fan-off delay P2 "based on at least one heating cycle duration selected from the group consisting of: a heating on time defined from when the thermostat initiates a call for heating until the thermostat terminates the call for heating, and a heating off time defined from when the thermostat terminates the call for heating until the thermostat initiates the call for heating plus the heating on time."

U.S. Pat. No. 10,066,849 (Lau '849) (Application Publication No. 2017/0051936) discloses an "energy saving controller configured for mounting between a thermostat and the controller for an air handler unit having a fan and at least a member of a group consisting of a heater and a compressor. The energy saving controller includes a temperature probe for reading the temperature of a room where the thermostat is located and being configured to control the air handler unit based on a demand response request received from a utility provider via the Internet and an input from the temperature probe." Known air handlers are controlled by thermostats which have a temperature sensor. Smart communication thermostats devices with temperature sensors and WIFI technology for wireless local area networking based on the IEEE 802.11 are enabled to control air handler units based on a dem and response request received from the thermostat manufacturer (i.e., Nest, ecobee, Venstar) or a utility provider.

U.S. Pat. No. 10,174,966 (Lau '966) (Application Publication No. 2018/00386511) filed on Oct. 18, 2017 discloses an "An energy saving controller for an air handler having a heater and a dual speed fan adapted to switch between a first speed and a second higher speed via a gas furnace controller, the energy saving controller being configured to be mounted between a thermostat and the gas furnace controller, and having: input terminals configured to connect to corresponding thermostat output terminals and receive output signals; a microcontroller configured to: process the output signals into revised signals; and cause the gas furnace controller to alternate between the first speed and the second higher speed to mimic a behavior of a variable speed fan; drivers configured to receive the revised signals and use the revised signals to actuate mechanical relays; wherein the mechanical relays are configured to actuate the fan or the compressor via ESC output terminals; and means for causing the alternation." Mowris U.S. Pat. No. 9,797,405 issued on Oct. 24, 2017 (filed on Mar. 22, 2012) includes Claim "6. The method of claim 1, wherein energizing the fan relay signal increases the fan speed of the ventilation fan to a fan speed higher than a low heater ventilation fan speed when the fan relay is de-energized." Walsh U.S. Pat. No. 9,500,386 issued on Nov. 22, 2016 (filed Aug. 30, 2016) col. 20, lines 9-24 discloses "To achieve optimal performance in gas furnace heating mode, the fan controller 211 can be configured to include a high-voltage relay to directly drive the high-speed tap of the fan/blower 206 and circumvent the OEM blower controller board 238 default fan speeds and operate the fan/blower 206 at the high-speed used for cooling after the time P1 has expired, and continue operating the fan/blower at high speed throughout the heat-source operational time P3 and the extended fan-off time delay period P2." Mowris U.S. Pat. No. 9,671,125 (125) issued on Jun. 6, 2017 (filed Nov. 22, 2016) includes FIGS. 32 and 33 and col. 15, lines 15-21 discloses "FIG. 33 shows elements of the fan controller according to an embodiment of the present invention with a two switching devices 316, and 318 which connect the fan controller high-voltage input signals 233 and 320 to the high-voltage taps 11 and 15 on the system fan/blower 206. These signals allow the fan 206 to operate is a low speed and then switch to a high speed after time period P1." The '125 also claims switching a heating ventilation fan from a low speed to a high speed in Col. 57, line 63 through Col. 58 line 16 as follows: "3. The method of claim 1, wherein the fan relay is a high-voltage relay element of a fan controller connected to a high-speed tap on a fan/blower motor to operate the fan/blower at a high speed, and operating in the heating mode, the method further including: waiting the first time period P1 selected from the group consisting of: a time period when the heat source is first energized, a time period after the heat source is first energized, a time period between when the heat source is first energized and the heat-source operational time P3, the heat-source operational time P3, a time period when the cool source is first energized, a time period after the cool source is first energized, a time period between when the cool source is first energized, and the cool-source operational time P4; energizing the high-voltage relay at the end of the first time period P1."

U.S. Pat. No. 5,042,264 (Dudley '264) discloses a method for detecting and correcting reversing valve failures in heat pump systems having a variable speed compressor. Temperatures in the inside heat exchanger or both the inside and outside heat exchangers of a reversible vapor compression refrigeration system are sensed before and after a system startup or mode change. If the reversing valve is positioned properly, the temperature should change in a certain way because of the operating change, e.g., on a startup in cooling mode, the inside heat exchanger temperature should decrease. If the temperatures actually sensed do not change in the predicted way, it is an indication that the reversing valve is incorrectly positioned for the operating mode selected. If the temperature changes indicate that the reversing valve is out of position, the variable speed compressor is operated at its maximum speed for a short time. If the temperature change is now as expected, the valve has changed to the proper position. If the temperatures still have not changed in the way predicted, the reversing valve is still improperly positioned. This indicates a malfunctioning valve and the system is shut down.

U.S. Pat. No. 4,262,736 (Gilkeson '736) discloses an apparatus for heat pump malfunction detection. A malfunction detection apparatus is provided for a heat pump system incorporating auxiliary resistance heaters, for detecting when the heat pump has lost efficiency, due to less than a catastrophic failure, and is therefore energizing the resistance heaters when they would not normally be energized, whereby a signal may be provided, such as a warning light, for announcing when the resistance heater has been energized while the outside temperature is above the system balance point.

U.S. Pat. No. 4,574,871 (Parkinson '871) discloses a fault detection apparatus which monitors a heat pump system used for maintaining a selected temperature in an enclosed space is disclosed. The apparatus includes measuring the run time for a heat pump compressor, ascertaining the status of the heat pump reversing valve, measuring the run time of an auxiliary heating unit, measuring the run time of the defrost cycle of the heat pump, and sensing outdoor temperature. The compressor, the auxiliary heating unit, and the defrost cycle run times are each compared with their respective expected run times for the outdoor temperature sensed and for a known heat loss rate for the enclosed space. The apparatus will send out an alarm signal when the heat pump system fails to operate within the expected parameters.

Based on the prior art, unresolved needs exist to increase cooling or heating capacity to the conditioned space to improve thermal comfort, extend AC compressor or heating equipment off cycles, and improve energy efficiency. Prior art thermostats do not provide solutions to meet these unresolved needs.

BRIEF SUMMARY OF THE INVENTION

The present invention provides a variable fan-off delay for cooling or heating based on a measured Conditioned Space Temperature (CST) providing a reliable variable fan-off delay that does not cause short AC compressor cycling and is not dependent on relative humidity to ensure occupant comfort, extend the air conditioning or heating equipment off cycle and improve energy efficiency.

The present invention includes comparing the current value of CST measured during a current variable fan-off delay period to the CST values measured during the current variable fan-off delay period. Comparing the current CST measured during the current variable fan-off delay period to CST values monitored during the current variable fan-off delay period does not compare the CST to the Lower Mean Band Temperature (LMBT) or any other pre-determined temperature or a fan-cooling start temperature plus a small fixed value.

The present invention may also include turning off a heating or a cooling system and continuing to operate an HVAC fan until the CST reaches an Inflection Point (IP) where a rate of change of the CST with respect to time (dT/dt) equals zero plus or minus a confidence interval tolerance. The dT/dt is defined as a ratio of the difference between at least two temperature measurements of a CST divided by a difference between the times when the same two CST measurements were made.

The present invention may also include a thermostat turning off a heating or a cooling system and adjusting a current variable fan-off delay differential or differential offset based on at least one duration selected from the group consisting of: a duration of a previous fan-off delay time P2, a heating cycle duration P3, a cooling cycle duration P4, and an off-cycle time P11. The fan-off delay differential is defined as a specific differential from the thermostat setpoint used to terminate a fan-off delay after a cooling cycle duration or a heating cycle duration. The fan-off delay differential offset from the thermostat differential is defined as a specific differential offset added to or subtracted from an upper heating differential or a lower cooling differential and used to terminate a fan-off delay after a cooling cycle duration or a heating cycle duration. After adjusting the current variable fan-off delay differential or differential offset, the thermostat continues to energize the fan for a heating or a cooling variable fan-off delay P2 until the CST reaches the heating or the cooling fan-off delay differential or differential offset. The heating variable fan-off differential or offset may be based on the Temperature Rise (TR) defined as the difference between the Supply Air Temperature (SAT) minus the Return Air Temperature (RAT) across the heat exchanger. The TR is measured as the difference between the SAT T2 sensor minus the RAT T1 sensor. The TR is measured as the difference between the SAT T2 sensor minus the RAT T1 sensor. The cooling variable fan-off differential or offset may be based on the Temperature Split (TS) across the evaporator defined as the difference between the RAT minus the SAT. The TS is measured in cooling mode as the difference between the RAT T1 sensor minus the SAT T2 sensor. The TS is measured in cooling mode as the difference between the RAT T1 sensor minus the SAT T2 sensor. The TR or TS measurements are stored by a Remote Thermostat Unit (RTU) and transmitted to the thermostat via a wired connection or via a WIFI LAN.

The present invention may include providing a heating or cooling variable fan-off delay P2 based on at least one HVAC parameter selected from the group consisting of: a heating cycle duration P3 including at least one heating cycle selected from the group consisting of: a heating on cycle, and a heating off cycle; a cooling cycle duration P4 including at least one cooling cycle selected from the group consisting of: a cooling on cycle, and a cooling off cycle; an off-cycle time P11; a rate of change of the CST with respect to time (dT/dt); a heating TR across the heat exchanger; a cooling TS across the evaporator; an Outdoor Air Temperature (OAT); a Mixed Air Temperature (MAT); an SAT; and a rate of change of any of these HVAC parameters with respect to time. The rate of change of CST or any HVAC parameter with respect to a time period is defined as the ratio of the change in the variable divided by the duration of the time period. In another embodiment, the variable fan-off delay is initiated after the cooling or heating thermostat setpoint temperature has been reached.

The present invention thermostat may also include a Fault Detection Diagnostic (FDD) method to monitor, detect, report, and override a fan-on setting and turn off an HVAC fan is controlled by a fan-on setting and turned "ON" by itself for longer than a Threshold Fan-on Time (TFT) without a thermostat call for cooling or heating. The FDD method checks if the fan-on time (F6) is greater than a Threshold Fan-on Time (TFT) which will vary depending on monitored HVAC parameters in combination with an occupancy sensor to evaluate building occupancy or a Carbon Dioxide ($CO_2$) sensor to evaluate indoor air quality requirements. As noted above, prior art patents '805, '898, '550 and '809 disclose using occupancy sensors to turn OFF a ceiling fan or an HVAC system when a building is unoccupied, but do not disclose diagnosing whether or not an HVAC fan is accidentally turned "ON" and operating by itself without a call for cooling or heating irrespective of building occupancy. After the FDD method detects the fan-on setting turning the HVAC fan on by itself for longer than a TFT as shown in FIG. 13, the present invention can generate a FDD alarm fan-on message using a display, an email, a text, or other communication method.

The present invention may also include providing a continuous Heat Pump (HP) reversing valve signal throughout a cooling cycle duration plus a fan-off delay duration or a heating cycle duration plus a fan-off delay duration to provide maximum cooling or heating capacity and energy efficiency. Known thermostats energize the HP reversing valve during the cooling cycle or the heating cycle. Some known thermostats provide a user selectable fixed fan-off delay. Known thermostats do not provide information regarding the HP reversing valve signal status during the fixed fan-off delay period. Some know thermostats de-energize the HP reversing valve signal at the end of the thermostat call for cooling or heating which will cause the refrigerant system pressure to equalize and reduce the available cooling or heating energy in the evaporator or heat exchanger.

The primary benefits of the present invention are:
(1) monitoring, detecting, and reporting a Fault Detection Diagnostic (FDD) alarm short cycle message, and providing a variable cooling or heating differential temperature or a differential offset above or below the thermostat setpoint based on at least one HVAC parameter selected from the group consisting of: a heating cycle duration P3, a cooling cycle duration P4, and an off-cycle time P11 to control the heating cycle duration or the cooling cycle duration to avoid or correct short cycling and improve energy efficiency and thermal comfort;
(2) recovering latent evaporative cooling energy from an air conditioning evaporator coil after the air conditioner has operated for sufficient time to condense enough water vapor on the evaporator coil to deliver enough sensible cooling to the conditioned space to increase thermal comfort, extend the air conditioning off cycle and improve energy efficiency;
(3) energizing an HVAC fan to a higher fan speed than the lower heating fan speed during the heating cycle to increase airflow and heating energy delivered to the conditioned space and satisfy the thermostat call for heating in less time to save heating energy, increase thermal comfort, and improve energy efficiency;
(4) recovering heating energy from a gas furnace, heat pump, hydronic or electric resistance heat exchanger after the heating system has operated for sufficient time to increase the heat exchanger temperature enough to deliver enough heating energy to the conditioned space to increase thermal comfort, extend the heating equipment off cycle and improve energy efficiency;
(5) performing a Fault Detection Diagnostic (FDD) procedure comprising monitoring, detecting, reporting a FDD alarm fan-on message, and overriding a fan-on setting and turning off an HVAC fan is operating continuously by itself for longer than a Threshold Fan-on Time (TFT); and
(6) providing a continuous Heat Pump (HP) reversing valve signal throughout a cooling cycle duration plus a fan-off delay duration or a heating cycle duration plus a fan-off delay duration to provide maximum cooling or heating capacity and energy efficiency.

BRIEF DESCRIPTION OF THE SEVERAL VIEWS OF THE DRAWINGS

The above and other aspects, features and advantages of the present invention will be more apparent from the following more particular description thereof, presented in conjunction with the following drawings wherein:

FIG. 13 also shows a curve representing an embodiment of the present invention thermostat control with Fault Detection Diagnostics (FDD) to avoid continuous fan operation.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
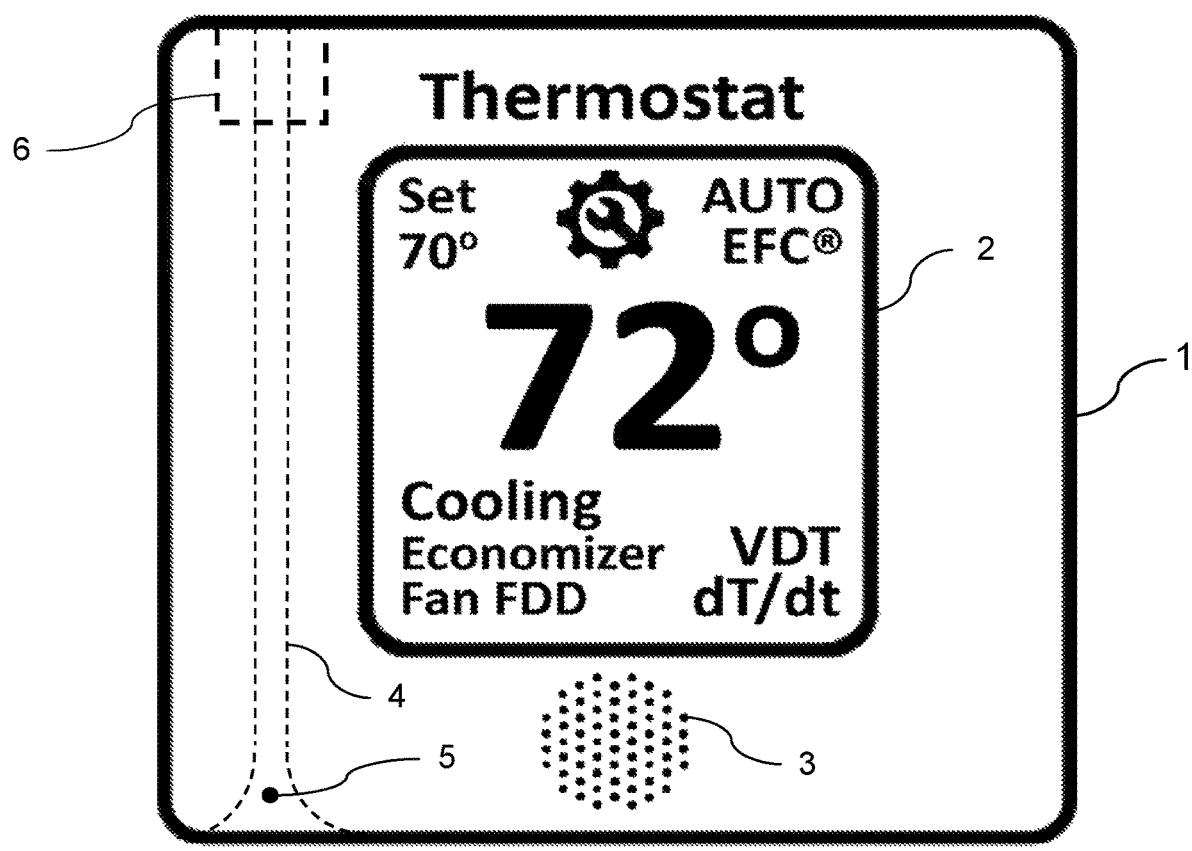
FIG. 1 shows a thermostat according to the present invention.

FIG. 1 shows a thermostat 1 used to control an HVAC unit. The thermostat 1 includes a display 2 providing a Variable Differential Temperature ("VDT") control option to improve cooling or heating system efficiency by varying the cooling or heating differential to correct for short cycle events and lengthen on-cycles to increase thermal comfort and energy efficiency, save energy and extend the service life of the equipment. According to the present invention, the VDT can be based on a cooling cycle duration P4, a heating cycle duration P3, an off-cycle time P11, or a fan-off delay time P2. The FIG. 1 display 2 shows a Fault Detection Diagnostic (FDD) option "Fan FDD" used to monitor, detect, report, and override a fan-on setting and turn off an HVAC fan operating longer than a TFT.

The display 2 also shows an Efficient Fan Controller® ("EFC®") option. The EFC® control option provides a variable fan-off delay to deliver additional cooling or heating capacity after the cooling or heating thermostat setpoint has been satisfied to improve thermal comfort and increase cooling or heating system efficiency. According to the present invention, the cooling or heating variable fan-off delay time P2 can be based on at least one HVAC parameter selected from the group consisting of: a heating cycle duration P3, a cooling cycle duration P4, an off-cycle time P11, a rate of change of the Conditioned Space Temperature (CST) with respect to time (dT/dt), a heating Temperature Rise (TR) across the heat exchanger, a cooling Temperature Split (TS) across the evaporator, an Outdoor Air Temperature (OAT), a Mixed Air Temperature (MAT), a Supply Air Temperature (SAT) or a rate of change of any of these HVAC parameters with respect to time. The variable fan-off delay P2 can also be based on the current CST measured during a current variable fan-off delay period compared to CST values collected during the current variable fan-off delay period. The method may include turning off an Occupancy sensor Output (OCC Out) to close economizer dampers during or after the fan-off time delay or providing a wired low-voltage or digital signal or wireless signal to close economizer dampers during or after the fan-off delay. Alternatively, the method may include turning on the OCC Out, or providing the wired low-voltage or digital signal or the wireless signal to open the economizer dampers during or after the fan-off delay. The display 2 also shows a "dT/dt" control option that can provide a variable fan-off delay based on the CST rate of change with respect to time (CST dT/dt) or CST measured during the variable fan-off delay. Measurements of the CST dT/dt during the off-cycle can be used as a proxy for the cooling or heating load during the off-cycle. For cooling, the "dT/dt" variable fan-off delay continues while the current CST dT/dt is less than the off-cycle dT/dt off times a coefficient C2. For heating, the "dT/dt" variable fan-off delay continues while the current CST dT/dt is greater than the off-cycle dT/dt off times a coefficient C1.

The thermostat 1 may include at least one sensor 3 selected from the group consisting of: a motion sensor, an infrared occupancy sensor, and a humidity sensor. The thermostat also includes a home screen and navigation features to other screens to setup the thermostat, change controls or view information.

The thermostat 1 may include at least one convection pathway 4 of air from the conditioned space to be drawn through due to a passive thermal siphoning of air caused by at least one warm electronic component 6 located near the convection pathway which produces a temperature gradient to facilitate the passive thermal siphoning of air over a thermostat sensor 5 located near or inside the convection pathway 4 in order for the thermostat sensor 5 to obtain an accurate CST measurement. Known Smart thermostats use power supplies, solid state relays and circuitry which produce a bulk heat as disclosed in U.S. Patent Application Publication No. 2018/0149381 ('381) and the bulk heat can increase a temperature measurement of the CST providing an inaccurate measurement of the CST which can potentially result in operating an HVAC system longer than necessary to satisfy a thermostat setpoint causing wasted energy and occupant discomfort. Furthermore, in certain situations of a severe over current condition (as described in the '381), the bulk heat can potentially cause damage to a microprocessor which might cause the affected solid state relays to shut down. Certain embodiments of the present invention provide a convection pathway to allow improved passive heat transfer from the warm electronic power supplies, solid state relays and circuitry components to improve thermostat reliability and accuracy.

Figure 2:
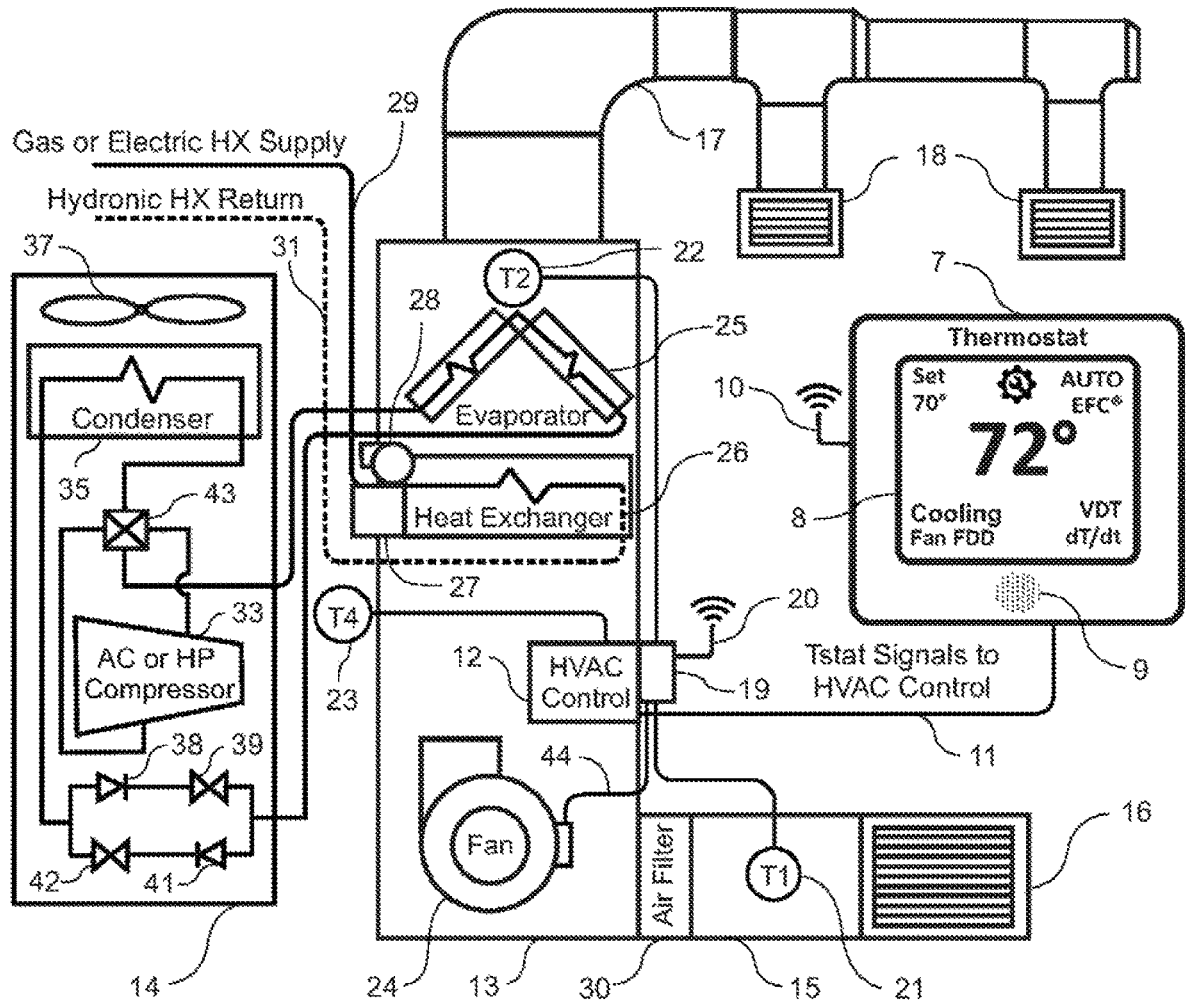
FIG. 2 shows a thermostat according to the present invention controlling an HVAC split system including at least one system selected from the group consisting of: (1) a Direct-Expansion (DX) air conditioning or heat pump cooling system, (2) a gas furnace heating system, (3) a heat pump heating system, and (4) an electric resistance heating system.

FIG. 2 shows a diagram of an HVAC split system controlled by a thermostat 7 for according to the present invention. The thermostat 7 includes a display screen 8 indicating various control options, a motion or infrared occupancy sensor or humidity sensor 9, a Wireless Fidelity (WIFI) local area network communication channel 10, and a low-voltage wiring harness 11 including at least one signal selected from the group consisting of: a G wire to control an HVAC fan, a Y1 wire to control a first-stage Air Conditioning (AC) or Heat Pump (HP) compressor for cooling or heating, a Y2 wire to control a second-stage AC or HP compressor for cooling or heating, a W1 wire to control a first-stage gas furnace, hydronic or electric resistance heating source, a W2 wire to control a second-stage gas furnace, hydronic or electric resistance heating source, a C common wire from the 24-volt common equipment transformer, an Rc wire from the 24-volt equipment transformer, Rh 24-volt for electric heating stage, Aux an auxiliary output, DI1 configurable digital input, DI2 configurable digital input, RS remote room temperature sensor, Occ occupancy sensor, Return Air Temperature (RAT) sensor, MAT sensor, SAT sensor, and OAT sensor.

FIG. 2 shows the low voltage wiring harness 11 connected to an HVAC controller terminal block 12 used to control an indoor Forced Air Unit (FAU) 13 and an outdoor condensing unit 14 connected to a return duct air distribution system 15 with return register or registers 16 and a supply duct air distribution system 17 with a supply register or registers 18.

The thermostat 7 may include a Remote Thermostat Unit (RTU) 19 with a WIFI Local Area Network (LAN) communication channel 20 where the thermostat 7 or remote thermostat unit 19 can be used to collect HVAC sensor data including at least one measurement parameter selected from the group consisting of: a RAT T1 sensor 21, a SAT T2 sensor 22, and an OAT T4 sensor 23. The thermostat 7 may also include the following optional sensors (not shown in FIG. 2): a return Relative Humidity (RH) sensor, a supply RH sensor, an outdoor air RH sensor, a return Carbon Dioxide (CO) sensor, a supply air CO sensor, an outdoor air CO sensor, refrigerant temperature sensor, a refrigerant pressure sensor, a refrigerant flow rate sensor, a compressor power (kW) sensor, a fan power (kW) sensor, a condenser fan power (kW) sensor, a hydronic supply temperature sensor, a hydronic return temperature sensor, and a hydronic pump power (kW) sensor.

The RTU 19 can be used to send measurement data from multiple sensors located at the FAU to the thermostat 7 using a wireless or wired LAN. The RTU 19 can minimize the number of wires going to the thermostat 7 while increasing the number of sensors the thermostat 7 can process. The RTU 19 also may provide wired or wireless control signals to the FAU such as G, Y1, Y2, W1, and W2, if insufficient low voltage control wires are provided. For example, if a single-stage HVAC system was initially installed, and later upgraded to a multistage HVAC system, there might not be sufficient low voltage thermostat wires in the wall to accommodate the Y1, Y2, W1, and W2 thermostat signals.

The thermostat 7 and the RTU 19 can be used to monitor at least one HVAC parameter selected from the group consisting of: 1) the return air temperature T1 sensor 21 or a return air RH sensor, or a return air CO2 sensor 21, 2) a supply air temperature T2 sensor 22, or a supply air RH sensor, a supply air CO2 sensor, or 3) an outdoor air temperature T2 sensor 23 or an outdoor air RH sensor, an outdoor air CO2 sensor. The indoor FAU 13 may include at least one element selected from the group consisting of: 1) an HVAC fan and blower 24 to circulate ventilation air through the indoor FAU 13, 2) a Direct Expansion (DX) evaporator coil 25, 3) a heat exchanger coil 26 for a gas furnace, hydronic heating, or electric heating system, 4) a gas furnace burner assembly 27 including a pressure switch, gas valve, ignitor, manifold, and burner, and 5) a vented combustion air inducer blower and motor assembly 28. The RTU 19 may have a wireless or wired connection 44 to the HVAC fan and blower to allow the present invention thermostat 7 to control the speed of the HVAC fan if the HVAC fan has a multi- or variable-speed motor. For example, after the gas furnace HX reaches operating temperature, the present invention thermostat 7 can operate the HVAC to a higher fan speed to deliver more heating energy to the conditioned space in order to satisfy the thermostat call for heating in less time and save energy.

To achieve optimal performance in gas furnace heating mode, the present invention thermostat 7 communicates HVAC fan speed information to the RTU 19. The RTU 19 includes a high-voltage relay to directly drive the high-speed tap of the HVAC fan and circumvent the OEM blower controller default fan speeds. This allows the RTU 19 to operate the HVAC fan at a high-speed after the fan-on delay P1 has expired, and continue operating the HVAC fan at high speed throughout the heating cycle duration P3 and the variable fan-off time delay P2. The thermostat 7 can send and receive fan speed data and commands to/from the RTU 19 using at least one communication method selected from the group consisting of: 1) low-voltage signals over the existing Fan G wire to command the RTU 19 to enable the high-voltage relay connected to the high-speed tap of the HVAC fan motor, 2) Wireless Fidelity (WIFI) local area network communication can be used to send fan speed and other data to and from the thermostat and RTU 19, 3) rectified or half-wave rectified low voltage signals can be used to control fan speed, and 4) a high-frequency modulated signal can be applied to the low-voltage fan G wire or any other wire in the low-voltage wiring harness 11, and this signal can be decoded by the RTU 19 to indicate what speed the HVAC fan should operate.

The indoor FAU 13 may also include a gas heat exchanger supply 29 or an electric heat exchanger power supply, or a hydronic hot water heating supply (with pump to circulate hot water through the hydronic heat exchanger). The indoor FAU may also include an air filter assembly 30 and a hydronic heat exchanger water return 31.

The outdoor unit 14 may include a AC or HP compressor 33 for cooling or heating, a condenser 35 to reject heat for an AC DX cooling system or to accept heat for a HP DX heating system, a condenser fan 37 to circulate air through the condenser to reject heat for an AC DX cooling system or to accept heat for a HP DX heating system, a bypass valve 38 for a heat pump to allow refrigerant flow to the expansion device for cooling and prevent refrigerant flow for heat pump heating (not required for an AC cooling only system), an DX expansion device 39 for AC or HP cooling mode, a bypass valve 41 for a heat pump to allow refrigerant flow to the expansion device for heating and prevent refrigerant flow for heat pump cooling (not required for an AC cooling only system), a HP DX expansion device 42 for HP heating mode, and a HP reversing valve 43 to reverse the flow of refrigerant for heating to enable the condenser to accept heat from the outdoor ambient air and the evaporator to reject heat from the indoor air and when the HP reversing valve is in the opposite position the flow of refrigerant for cooling will enable to condenser to reject heat to the outdoor air ambient air and the evaporator to accept heat from the indoor air.

Figure 3:
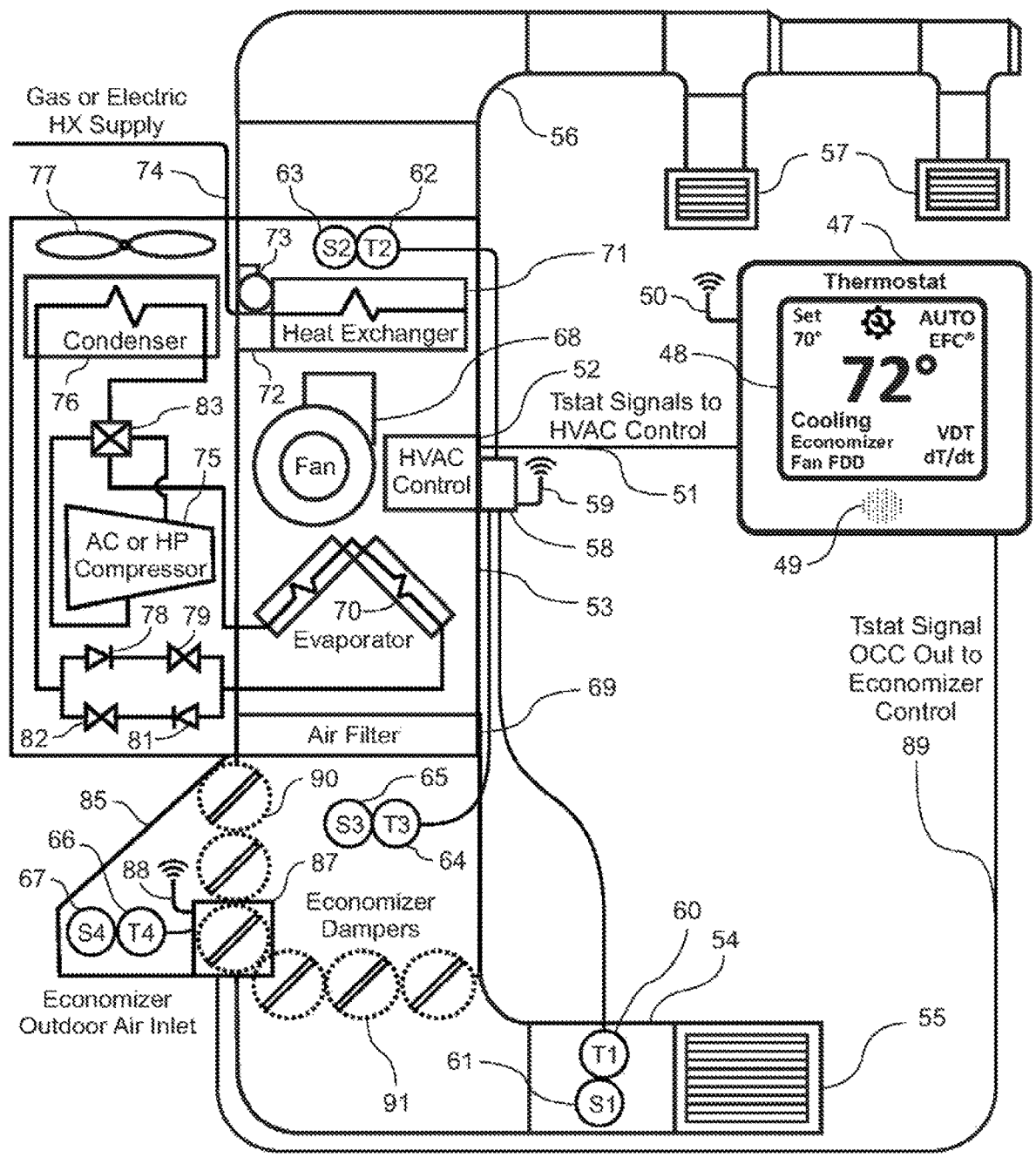
FIG. 3 shows a thermostat according to the present invention controlling an HVAC packaged system including at least one system selected from the group consisting of: (1) a DX air conditioning or heat pump cooling system, (2) a gas furnace heating system, (3) a heat pump heating system, and (4) an electric resistance heating system.

FIG. 3 shows a diagram of an HVAC packaged system 53 with an economizer 85 controlled by a thermostat 47 according to the present invention where the thermostat 47 includes a display screen 48 indicating various control options, a motion or infrared occupancy sensor or humidity sensor 49, a Wireless Fidelity (WIFI) local area network communication channel 50, and a low-voltage wiring harness 51 including at least one signal selected from the group consisting of: a G wire to control an HVAC fan, a Y1 wire to control a first-stage AC or HP compressor for cooling or heating, a Y2 wire to control a second-stage AC or HP compressor for cooling or heating, a W1 wire to control a first-stage gas furnace, hydronic or electric resistance heating source, a W2 wire to control a second-stage gas furnace, hydronic or electric resistance heating source, a C common wire from the 24-volt common equipment transformer, an Rc wire from the 24-volt equipment transformer, Rh 24-volt for electric heating stage, Ec 0 to 10 volt economizer actuator output, Aux an auxiliary output, DI1 configurable digital input, DI2 configurable digital, RS remote room temperature sensor, Occ occupancy sensor, RAT return air temperature sensor, MAT mixed air temperature sensor, SAT supply air temperature sensor, and OAT outdoor air temperature sensor.

The low voltage wiring harness 51 is connected to an HVAC controller terminal block 52 used to control an HVAC packaged system 53 and economizer 85 connected to a return duct air distribution system 54 with return register or registers 55 and a supply duct air distribution system 56 with a supply register or registers 57.

The thermostat 47 may include a remote thermostat unit 58 with a WIFI Local Area Network (LAN) communication channel 59 where the thermostat 47 or remote thermostat unit 58 can be used to collect HVAC sensor data including at least one measurement parameter selected from the group consisting of: an RAT T1 sensor 60, a return air relative humidity (RH) or $CO_2$ S1 sensor 61, a supply air temperature T2 sensor 62, a supply air RH or $CO_2$ S2 sensor 63, a mixed air temperature T3 sensor 64, a mixed air RH or $CO_2$ S3 sensor 65, an outdoor air temperature T4 sensor 66, an outdoor air RH or $CO_2$ S4 sensor 67, a supply air static pressure, a return air static pressure, a mixed air static pressure, an outdoor air static pressure, a condenser static pressure, an evaporator or heat exchanger airflow (unit volume per unit time), a refrigerant temperature, a refrigerant pressure, a refrigerant flow rate, an AC HP compressor power (kW) a fan power (kW), and a condenser fan power (kW).

The thermostat 47 or the Remote Thermostat Unit (RTU) 58 shown in FIG. 3, may also be used to monitor at least one HVAC parameter selected from the group consisting of: 1) a return air temperature T1 sensor 60 or a return air RH or $CO_2$ S1 sensor 61, 2) a supply air temperature T2 sensor 62 or a supply air RH or $CO_2$ S2 sensor 63, or 3) a mixed air temperature T3 sensor 64 or a mixed air RH or $CO_2$ S3 sensor 65, or 4) an outdoor air temperature T4 sensor 66 or an outdoor air RH or $CO_2$ S4 sensor 67. The packaged unit 53 may include at least one element selected from the group consisting of: 1) an HVAC fan and blower 68 to circulate indoor ventilation air through the HVAC unit, 2) an air filter assembly 69, 3) a DX evaporator coil 70, 4) a heat exchanger coil 71 for a gas furnace or electric heating system, 5) a gas furnace burner assembly 72 including a pressure switch, gas valve, ignitor, manifold, and burner, 6) a vented combustion air inducer blower and motor assembly 73, 7) a gas or electric HX supply 74, 8) an AC or HP compressor 75 for cooling or heating, 9) a condenser 76 to reject heat for an AC DX cooling system or to accept heat for a HP DX heating system, 10) a condenser fan 77 to circulate air through the condenser to reject heat for an AC DX cooling system or to accept heat for a HP DX heating system, 11) a bypass valve 78 for a heat pump to allow refrigerant flow to the expansion device for cooling and prevent refrigerant flow for heat pump heating (not required for an AC cooling only system), 12) a DX expansion device 79 for AC or HP cooling mode, 13) a bypass valve 81 for a heat pump to allow refrigerant flow to the expansion device for heating and prevent refrigerant flow for heat pump cooling (not required for an AC cooling only system), 14) a HP DX expansion device 82 for HP heating mode, and a HP reversing valve 83 to reverse the flow of refrigerant for heating to enable the condenser to accept heat from the outdoor ambient air and the evaporator to reject heat from the indoor air and when the HP reversing valve is in the opposite position the flow of refrigerant for cooling will enable to condenser to reject heat to the outdoor air ambient air and the evaporator to accept heat from the indoor air, 15) an economizer 85 including controller, actuator, outdoor air dampers, return air dampers, economizer controller, sensors, and hood, 16) economizer controller and actuator 87, 17) a Wireless Fidelity (WIFI) 88 LAN communication channel, 18) a thermostat signal to economizer controller OCC Out 89 (occupancy input) or economizer actuator (0 to 10V damper position controller), 19) an economizer outdoor air dampers 90, 20) economizer return air dampers 91.

Figure 4:
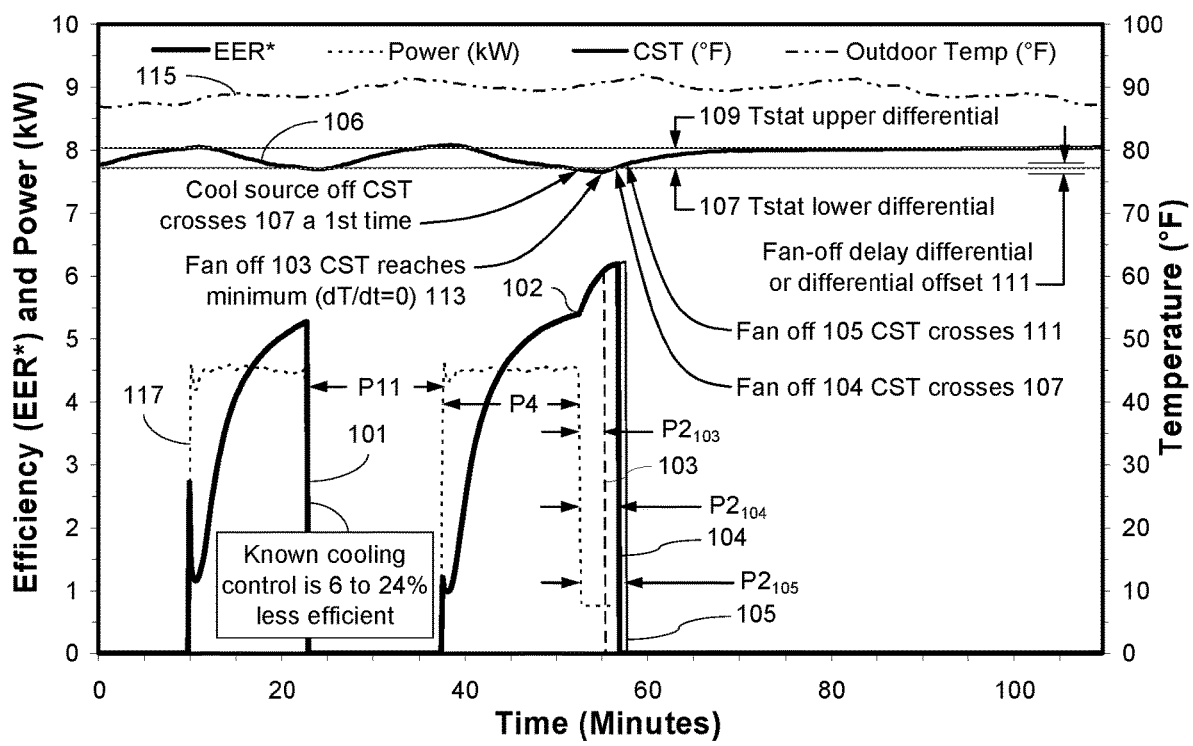
FIG. 4 shows a graph of cooling efficiency (Energy Efficiency Ratio, EER), cooling system power, outdoor air temperature, indoor thermostat temperature, and rate of change of indoor thermostat temperature versus time of operation for a direct-expansion air conditioning cooling system with known control and the present invention control.

FIG. 4 shows graphs representing the sensible cooling Energy Efficiency Ratio (EER*) versus time of operation for a DX AC cooling system with a known cooling control curve 101 and the present invention cooling controls curves 103, 104, and 105. The EER* is defined as the total delivered sensible cooling energy measured in British thermal units (Btu) divided by the total electrical power input measured in Watt-hours (Wh).

Also shown in FIG. 4 are graphs representing the total cooling system power measured in kiloWatts (kW) 117, the outdoor air temperature 115, the Conditioned Space Temperature (CST) 106, a known lower thermostat differential 107 used to turn off the cooling system, and a known upper thermostat differential 109 used to turn on the cooling system.

FIG. 4 displays the EER* curve 101 representing the known control which turns off the AC compressor, condenser fan, and cooling ventilation fan when the CST 106 decreases to a lower thermostat differential 107 a first time. The no delay known control curve 101 cooling EER* is 5.27.

FIG. 4 displays an EER* curve 103 representing an embodiment of the present invention control (fan off curve 103). The AC compressor and condenser fan are turned off when the CST reaches the lower thermostat differential 107 as shown in FIG. 4 where the power curve 117 drops from about 4.5 kW to 0.76 kW at 102. The cooling ventilation fan continues to operate for a variable fan-off delay time ($P2_{103}$) until the CST reaches a minimum Inflection Point (IP) at 113 where the rate of change of the CST with respect to time (dT/dt) is approximately equal to zero plus or minus a confidence interval tolerance. The fan off curve 103 cooling EER* is 6.1 which is 13% greater than the no delay 5.4 EER* at 102.

FIG. 4 displays an EER* curve 104 representing another embodiment of the present invention control (fan off 104) where the cooling ventilation fan continues to operate for a variable fan-off delay time ($P2_{104}$) until the CST increases and crosses the lower differential 107 again at least once. The fan off curve 104 EER* efficiency is 6.17 which is 14.3% greater than the no delay 5.4 EER* at 102.

FIG. 4 displays an EER* curve 105 representing another embodiment of the present invention control (fan off 105) where the cooling ventilation fan continues to operate for a variable fan-off delay time ($P2_{105}$) until the CST increases and crosses a fan-off delay differential or a differential offset 111 one or more times. The fan off curve 105 EER* efficiency is 6.25 which is 15.7% greater than the no delay 5.4 EER* at 102. The fan-off delay differential or differential offset varies based on at least one duration selected from the group consisting of: a duration of a previous fan-off delay time P2, a cooling cycle duration P4, and an off-cycle time P11.

In alternative embodiments of the present invention, the variable fan-off delay time P2 can be based on the Temperature Split (TS) across the evaporator, the cooling cycle duration P4, or the off-cycle time P11. Operating individually or together, these variable fan-off delay embodiments can be used to recover and deliver additional sensible cooling energy from DX cooling or latent evaporative cooling (from water condensed on the evaporator during the DX cooling cycle) in order to improve efficiency and thermal comfort and save energy by reducing AC compressor operating time.

Figure 5:
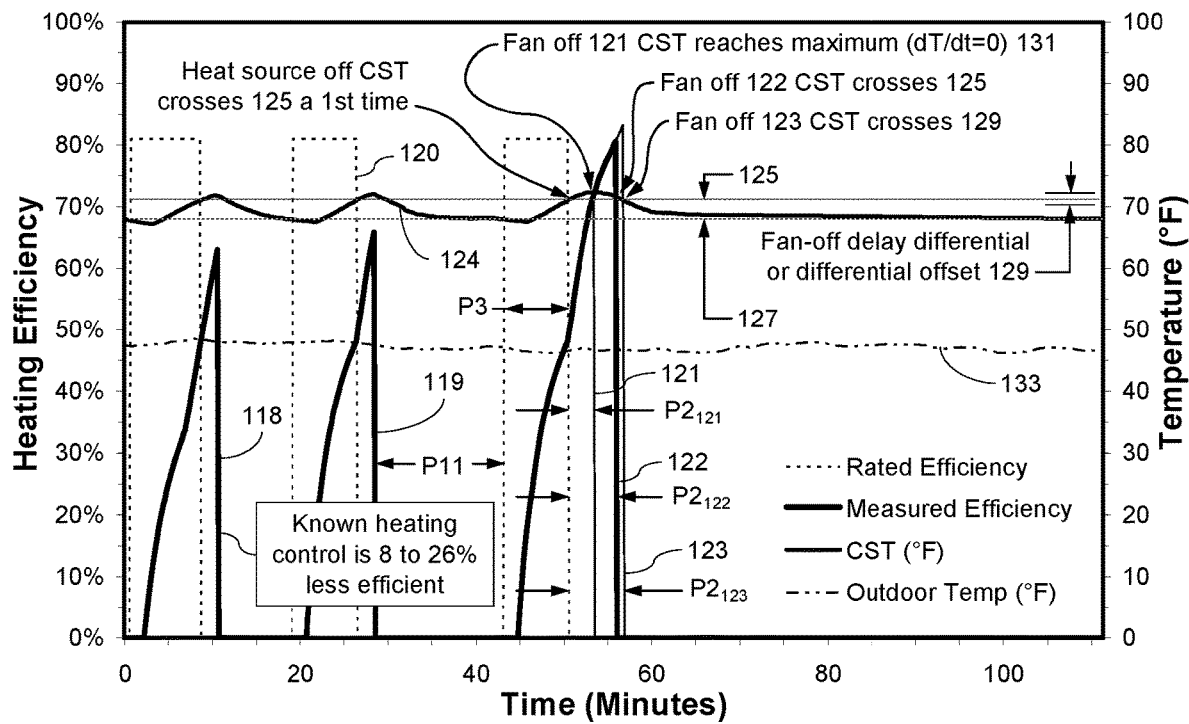
FIG. 5 shows a graph of heating efficiency, outdoor air temperature, indoor thermostat temperature, and rate of change of indoor thermostat temperature versus time of operation for a gas furnace heating system with a known control and the present invention control.

FIG. 5 shows graphs representing the heating efficiency versus time of operation for a gas furnace heating system with known heating control curves 118 and 119 and the present invention heating controls curves 121, 122, and 123. The heating efficiency is defined as the total delivered heating energy measured in British thermal units (Btu) divided by the total gas energy input measured in Btu.

Also shown in FIG. 5 are graphs representing the rated efficiency 120, outdoor air temperature 133, the CST 124, a known upper thermostat differential 125 used to turn off the heating system, and a known lower thermostat differential 127 used to turn on the heating system.

FIG. 5 displays the heating efficiency curves 118 and 119 as the known control. The known control turns on the furnace when the CST reaches a lower differential 127 and turns off the furnace when the CST reaches an upper differential 125. The known control heating ventilation fan operates for a fixed fan-off delay time after the known control turns off the heating system. For a gas furnace, the known control allows the Forced Air Unit (FAU) to control the heating fan-off delay using either a temperature-based fan-off delay or a fixed-time fan-off delay where the fixed-time delay is selected by an installer or is a default factory setting. For curve 118 the known control heating efficiency is 63% and the curve 119 known control heating efficiency is 65.8%.

FIG. 5 displays a heating efficiency curve 121 representing an embodiment of the present invention control (fan off 121) where the heating ventilation fan operates for a variable fan-off delay time ($P2_{121}$) until the CST reaches a maximum Inflection Point (IP) at 131 where the rate of change of the CST with respect to time (dT/dt) is approximately equal to zero plus or minus a confidence interval tolerance. The curve 121 heating efficiency is 71.7% which is 13.9% greater than the known control curve 118 efficiency of 63% and 9% greater than the known control curve 119 efficiency of 65.8%.

FIG. 5 displays a heating efficiency curve 122 representing another embodiment of the present invention control (fan off 122) where the heating ventilation fan continues to operate for a variable fan-off delay time ($P2_{122}$) until the CST increases and crosses the upper differential 125 again at least once. The curve 122 heating efficiency is 80.5% which is 27.8% greater than the curve 118 efficiency of 63% and 22.4% greater than the curve 119 efficiency of 65.8%.

FIG. 5 displays a heating efficiency curve 123 representing another embodiment of the present invention control (fan off 123) where the heating ventilation fan continues to operate for a variable fan-off delay time ($P2_{123}$) until the CST decreases and crosses the variable fan-off delay differential or differential offset 129 at least once. The curve 123 heating efficiency is 83.2% which is 32% greater than the curve 118 efficiency of 63% and 26.4% greater than the curve 119 efficiency of 65.8%. The heating fan-off delay differential or differential offset can vary depending on at least one duration selected from the group consisting of: a duration of a previous fan-off delay P2, a duration of a heating cycle P3, or an off-cycle time P11. Operating individually or together, these variable fan-off delay embodiments can be used to recover and deliver additional heating energy from a heat source to improve efficiency and thermal comfort and reduce heating system operating time to save energy.

Figure 6:
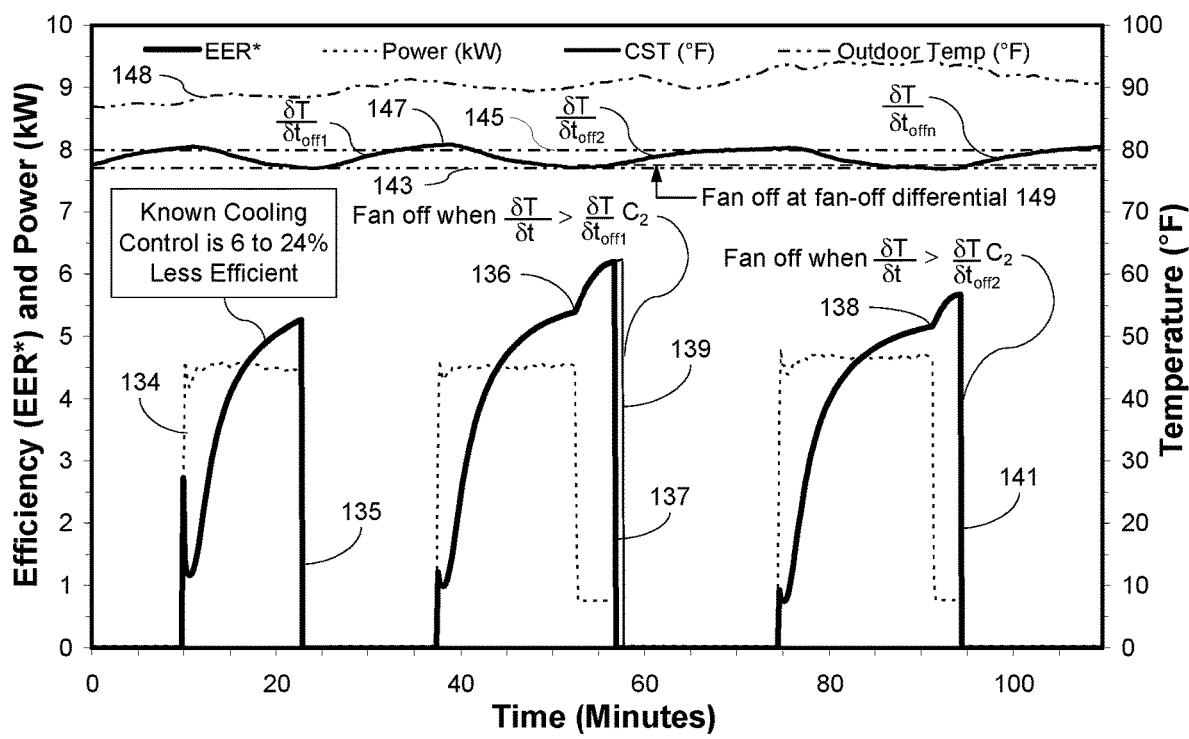
FIG. 6 shows a graph of cooling efficiency (Energy Efficiency Ratio, EER), cooling system power, outdoor air temperature, indoor thermostat temperature, and rate of change of indoor thermostat temperature versus time of operation for a direct-expansion air conditioning cooling system with various cooling cycle durations P4 and variable fan-off delay times P2 for the fan control according to an embodiment of the present invention.

FIG. 6 shows graphs representing the cooling EER* versus time of operation for a DX AC cooling system with known heating control curve 135 and the present invention cooling control curves 137, 139, and 141. Also shown in FIG. 6 are graphs representing the total power (kW) 134, outdoor air temperature 148, the CST 147, a known upper thermostat differential 145 used to turn on the cooling system, and a known lower thermostat differential 143 used to turn off the cooling system, and a fan-off differential or differential offset 149 used to terminate a variable fan-off delay.

FIG. 6 displays an EER* curve 137 representing an embodiment of the present invention control (fan off 137) where the cooling ventilation fan continues to operate until the current rate of change of CST 147 with respect to time (dT/dt) is greater than a previous cooling off-cycle dT/dt, or an IP of zero plus or minus a confidence interval tolerance. For curve 137, the CST 147 off-cycle rate of change with respect to time (dT/dt-off1) is 0.250° F./minute (from the end of curve 135 to start of curve 137) based on the 3.65° F. CST increase divided by 14.67 minutes off-cycle time. Field tests were used to determine a value of 1.0 for the $C_2$ coefficient. The $C_2$ coefficient might vary depending on the building efficiency, the HVAC system efficiency and capacity, and the time period used to measure the rate of change of CST 147 with respect to time. For curve 137, the value of (dT/dt-off1) times $C_2$ equals (0.250)1.0=0.25° F./minute. For curve 137, the dT/dt reaches 0.28° F./minute at 4.17 minutes and this is greater than 0.25° F./minute and the thermostat terminates the fan-off delay where the application sensible Energy Efficiency Rating* (EER*) is 6.2 or 17.6% greater than the known control curve 135. The value of dT/dt is calculated every 10-60 seconds during the fan-off delay and varies from −0.04 to 0.24° F./minute up to 4 minutes. From 4 to 4.17 minutes dT/dt increases to 0.28° F./minute where the present invention terminates the variable fan-off delay. If the dT/dt is measured over longer time periods, then the coefficient $C_2$ can be adjusted accordingly. When the curve 137 fan operation is terminated the sensible cooling EER* is 6.2 or 14.9% greater than the known control EER* of 5.4 at 136.

FIG. 6 shows a curve 139 representing the sensible cooling efficiency of another embodiment of the present invention continuing to operate the cooling ventilation fan for a variable fan-off delay until the CST 147 crosses a cooling fan-off delay differential or differential offset 149 at least once (CST crosses lower differential a first time satisfying thermostat and turning off cool source). When the curve 139 fan operation is terminated the sensible cooling EER* is 6.24 or 18.7% greater than the known control EER* of 5.4 at 136. The cooling fan-off delay differential or differential offset 149 is within 0 to 0.5° F. of the lower cooling differential and varies based on at least one HVAC parameter selected from the group consisting of: a previous fan-off delay time P2, a cooling cycle duration P4, an off-cycle time P11, dT/dt, and TS.

FIG. 6 displays another curve 141 representing another embodiment of the present invention where the cooling variable fan-off delay method is based on dT/dt-off. For curve 141, the CST 147 off-cycle rate of change with respect to time (dT/dt-off2) is 0.144° F./minute from the end of curve 137 to the start of curve 141 based on the 2.574° F. CST 147 increase divided by 17.833 minutes off-cycle time. For curve 141, the value of $(dT/dt-off2)C_2=(0.144)1.0=0.144°$ F./minute. The curve 141 dT/dt reaches 0.22° F./minute at 3 minutes which is greater than 0.144° F./minute and the thermostat terminates the fan-off delay. The curve 141 sensible cooling EER* is 5.7. In one embodiment of the present invention, dT/dt is calculated every 10-60 seconds during the fan-off delay and varies from −0.065 to 0.142° F./minute up to 2.83 minutes and dT/dt increases to 0.144° F./minute at 3 minutes where the method terminates the variable fan-off delay. When the curve 141 fan operation is terminated the sensible cooling EER* is 5.68 or 10% greater than the known control EER* of 5.16 at 138.

Figure 7:
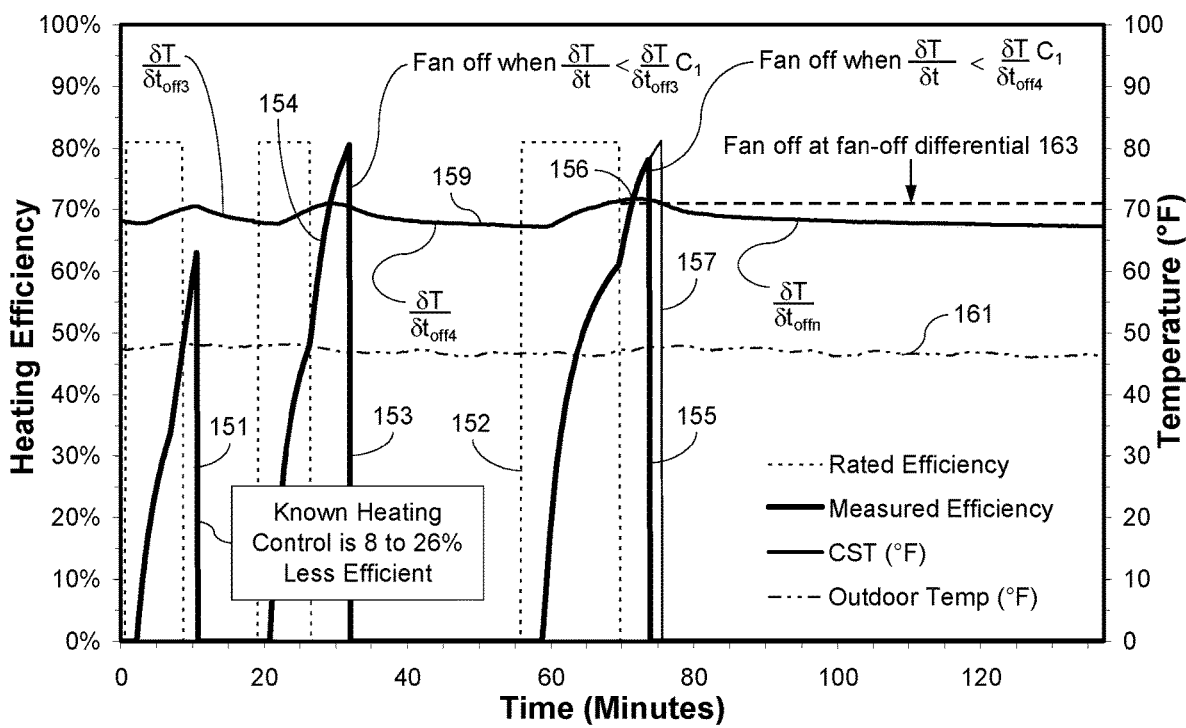
FIG. 7 shows a graph of heating efficiency, outdoor air temperature, indoor thermostat temperature, and rate of change of indoor thermostat temperature versus time of operation for a gas furnace heating system with various heating cycle durations P3, and variable fan-off times P2 for the fan control according to an embodiment of the present invention.

FIG. 7 shows graphs representing the heating efficiency versus time of operation for a gas furnace heating system with known heating control curves 151 and the present invention heating control curves 153, 155 and 157. Also shown in FIG. 7 are graphs representing the rated heating efficiency 152, outdoor air temperature 161, the CST 159, a fan-off differential or differential offset 161 used to terminate the variable fan-off delay.

FIG. 7 displays the heating efficiency curves 153 and 155 representing other embodiments of the present invention control energizing the fan relay to operate the heater ventilation for a variable fan-off delay for as long as the current dT/dt is greater than a constant, C1, multiplied times a previous heating off-cycle dT/dt−off1 (turn off variable fan-off delay when dT/dt<dT/dt−off). For curve 157 the present invention energizes the heater ventilation fan for a variable fan-off delay until the CST 159 crosses a fan-off delay differential or differential offset 163. FIG. 7 shows the CST 159 off-cycle rate of change with respect to time (dT/dt−off1) is approximately −0.484° F./minute from the end of curve 151 to the start of curve 153 based on −3.71° F. CST 159 decrease in temperature divided by 7.67 minutes off-cycle time. Field tests were used to determine a value of 1.0 for the C1 tolerance in this example. For curve 153, the (dT/dt−off1) times C1 equals (−0.484)1.0=−0.484° F./minute. For curve 153, the dT/dt reaches −0.51° F./minute at P2 of 5.67 minutes which is less than −0.484° F./minute and the thermostat terminates the fan-off delay. In one embodiment dT/dt is calculated every 10-60 seconds during the fan-off delay and can vary from 0.67 to −0.41° F./minute up to 5.5 minutes. From 5.5 to 5.67 minutes the dT/dt decreases to −0.51° F./minute where the present invention method terminates the variable fan-off delay. The curve 153 present invention heating efficiency reaches 80.5% which is 22% more efficient than the known control efficiency of 65.8% at 154.

FIG. 7 provides another example of the heating variable fan-off delay method based on dT/dt-off. The CST 159 rate of change with respect to time (dT/dt-off4) is −0.198° F./minute from the end of curve 153 to the start of curve 155 based on −4.63° F. CST 159 decrease divided by 23.33 minutes off-cycle time. As noted above, field tests were used to determine a value of 1.0 for the C1 tolerance which varies as a function of P3 and P11. For curve 155, (dT/dt-off4) times C1 equals (−0.198)1.0=−0.198° F./minute. For curve 155, the dT/dt reaches −0.216° F./minute at P2 of 4.33 minutes which is less than −0.198° F./minute and the thermostat terminates the fan-off delay. The value of dT/dt measured every 10 seconds during the fan-off delay varies from 0.281 to −0.151° F./minute up to 4.0 minutes. From 4.0 to 4.33 minutes dT/dt decreases to −0.216° F./minute where the present invention method terminates the variable fan-off delay (when dT/dt<dT/dt-off4 times C1). The curve 155 present invention heating efficiency reaches 78.2% which is 8.9% more efficient than the known control efficiency of 71.8% at 156.

FIG. 7 shows a curve 157 representing the heating efficiency with the present invention control energizing the fan relay to operate the fan for a variable fan-off delay until the CST 159 crosses the fan-off delay differential or differential offset 163 more than once (CST crosses upper differential a first time satisfying thermostat and turning off heat source). The curve 157 present invention heating efficiency reaches 81.2% which is 13.1% more efficient than the known control efficiency of 71.8% at 156. The fan-off delay differential or differential offset 163 is within +/−0.5 F of the upper heating differential and varies based on at least one HVAC parameter selected from the group consisting of: a previous fan-off delay time P2, the P3, the P11, the dT/dt, and the TR.

The required measurement accuracy of the dT/dt-off method is within the +/−0.2° F. accuracy of Resistance Temperature Detector (RTD) or thermister sensors used in thermostats.

Figure 8:
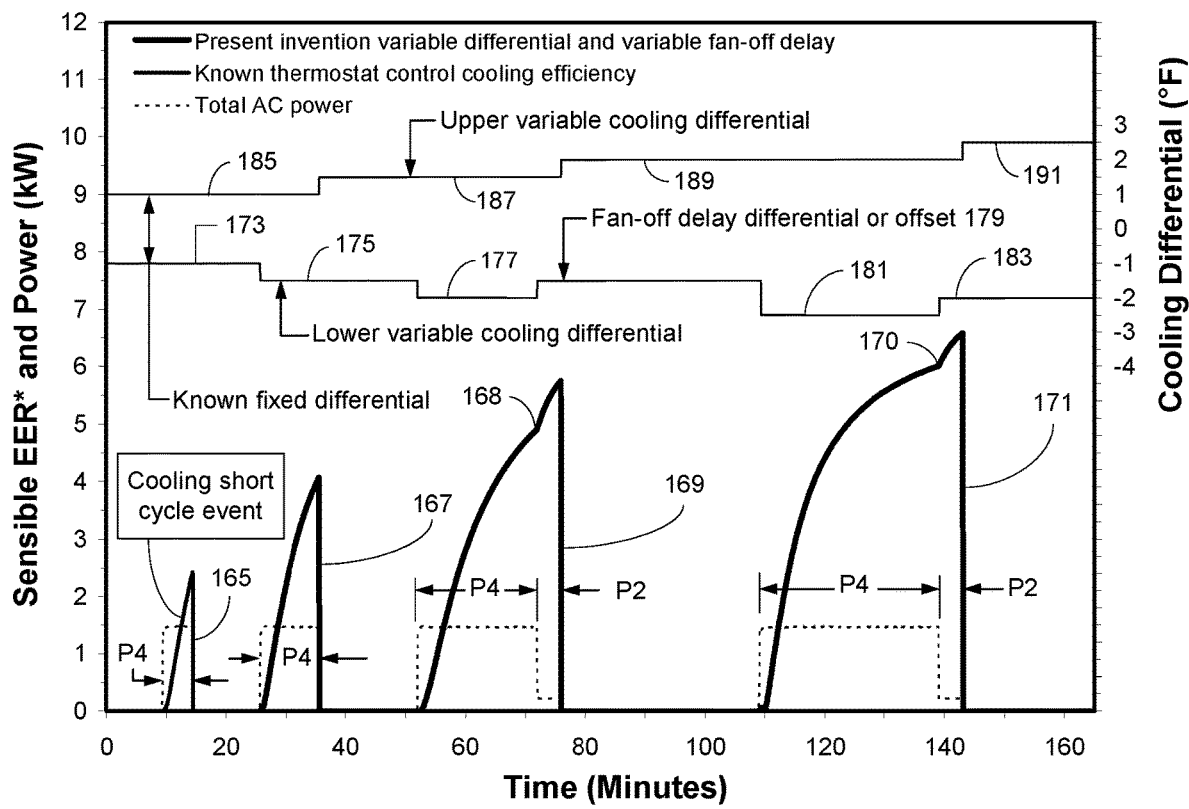
FIG. 8 shows graphs of sensible cooling efficiency and power (kW) versus time of operation on the left ordinate and thermostat cooling differential versus time of operation on the right ordinate for a direct-expansion air conditioning system with cooling cycle durations from 5 to 30 minutes.

FIG. 8 shows graphs of the sensible cooling Energy Efficiency Ratio (EER*) and power (kW) versus time of operation on the left ordinate and thermostat cooling differential versus time of operation on the right ordinate for a DX AC system with operational times from 5 to 30 minutes. The upper variable cooling differential is added to the thermostat setpoint and used to turn on cooling, and the lower variable differential (a negative number) is added to the thermostat setpoint and used to turn off cooling. The present invention also includes a fan-off delay differential or differential offset used to discontinue fan operation and terminate a variable fan-off delay. The known control uses a fixed +1 F upper differential 185 (to turn on the cool source) and a fixed −1 F lower differential 173 (to turn off the cool source). The +1 F fixed upper differential 185 balances the previous on-cycle to achieve the average thermostat setting.

Figure 13:
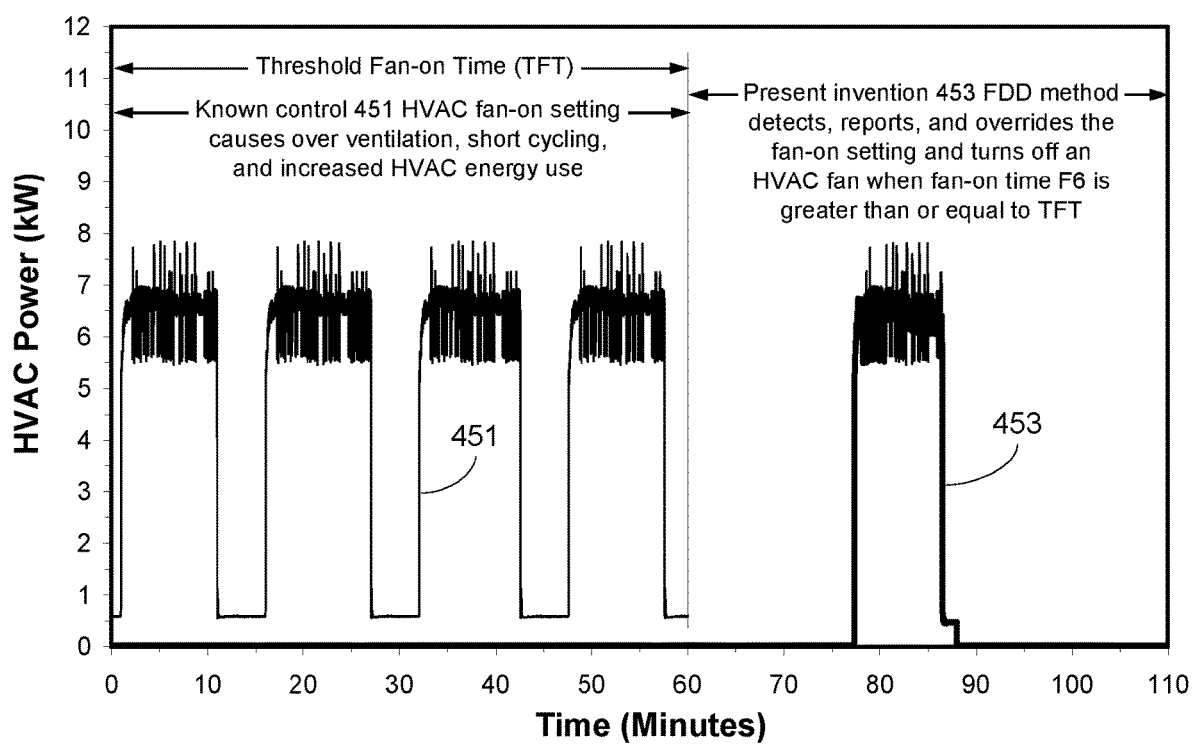
FIG. 13 shows a curve representing the total HVAC system power (kW) versus time of operation for a known thermostat fan control with continuous fan "ON" and over ventilation cause causing over ventilation, constant fan power, short cycling, and increased HVAC power and energy consumption.

FIG. 8 shows the EER* curve 165 representing the known control providing a 5-minute cooling "short-cycle" duration P4. The no delay known control curve 165 achieves a sensible cooling EER* of 2.42. According to the present invention, curve 165 is diagnosed as a "short cycle" event based on one or more consecutive cooling cycle durations P4 of less than or equal to 5 minutes. After detecting one or more consecutive short cycle events, due to fan-on continuously, where the HVAC system is short cycling as shown in FIG. 13, then the present invention generates a Fault Detection Diagnostic (FDD) alarm for either a fan-on fault or a short-cycle fault via display, email, text, or other communication method. According to one embodiment, the present invention can provide a FDD alarm for a short cycle fault and correct the short cycle event by providing a Variable Differential Temperature (VDT) control based on the previous short cycle P4 or other HVAC parameters to lengthen the next on-cycle to mitigate the short-cycle and improve thermal comfort and energy efficiency and extend the service life of the equipment. According to another embodiment, the present invention thermostat can provide a FDD alarm fan-on message and correct the fan-on fault by overriding a fan-on setting and turning off the HVAC fan after Threshold Fan Time (TFT).

FIG. 8 shows the EER* curve 167 representing a variable differential control according to the present invention with a known +1° F. fixed upper differential 185 to turn on the cooling system and a first −1.5° F. lower variable cooling differential 175 to turn off the cooling system. The lower variable cooling differential 175 is based on the previous cooling cycle duration P4 for curve 165. The +1° F. fixed upper differential 185 balances the previous cooling on-cycle to achieve the average thermostat setting. The −1.5° F. lower variable cooling differential 175 controls the cooling system to operate for 10 minutes (5 minutes longer than known control 165) and avoid short cycling to achieve a higher sensible EER* of 4.07 at the end of P4 and where the cooling system is turned off when the CST reaches the lower variable cooling differential 175. The present invention can increase the variable differential to lengthen the current cooling operating time P4 based on a previous cooling cycle duration P4 or an off-cycle duration P11 in order to improve thermal comfort and cooling efficiency.

FIG. 8 shows the EER* curve 169 representing a variable differential variable delay control according to the present invention with a first +1.5° F. variable upper differential 187 to turn on the cooling system and a second −2° F. lower variable cooling differential 177 to turn off the cool source where the first variable upper and second lower differential are based on the previous cooling cycle duration P4 shown in curve 167. The first variable upper differential 187 (+1.5° F.) balances the previous on-cycle to achieve the average thermostat setting and increases the duration of the off-cycle P11. The second lower variable cooling differential 177 (−2.0° F.) increases the cooling cycle duration to 20 minutes (10 minutes longer than curve 167) and achieve a higher sensible EER* of 4.9 at 168 when the AC compressor is turned off and the CST reaches the second lower variable cooling differential 177. FIG. 8 shows the EER* curve 169 increasing after the AC compressor is turned off as the cooling ventilation fan provides a variable fan-off delay P2 to evaporatively cool the air, improve occupant comfort, and extend the AC compressor off-cycle P11. When the delivered cooling energy is less than the building heat gains, and the CST increases to the second fan-off delay differential or differential offset 179 (−1.5° F.) whereupon the fan-off delay P2 is terminated and the curve 169 sensible cooling EER* improves to 5.75.

FIG. 8 curve 171 represents the cooling efficiency according to the present invention with a second +2° F. upper variable cooling differential 189 to turn on the cool source and third −2.5° F. lower variable cooling differential 181 to turn off the cool source where the second variable upper and third variable lower differential are based on the previous cooling system operating time P4 shown in curve 169. The second upper variable cooling differential 189 balances the previous cycle to achieve the average thermostat setting and allows the cool source to stay off longer after the last cycle. The third lower variable cooling differential 181 (−2.5° F.) increases the cooling system duration P4 to operate for 30 minutes (10 minutes longer than curve 169) to achieve higher sensible EER* of 6.0 at 170 when the AC compressor is turned off. FIG. 8 shows the EER* curve 171 increasing after the AC compressor is turned off as the cooling ventilation fan provides a variable fan-off delay P2 according to the present invention to evaporatively cool the air, improve occupant comfort, and extend the AC compressor off-cycle P11. When the delivered cooling energy is less than the building heat gains, and the CST increases to the second fan-off delay differential or differential offset 183 (−2° F.) whereupon the fan-off delay P2 is terminated and the curve 171 sensible cooling EER* improves to 6.58.

According to another embodiment of the present invention, the fan-off delay could continue to operate until the CST crosses the third lower variable cooling differential 181 (−2.5° F.) at least once or until CST reaches a minimum inflection point where the rate of change of the CST with respect to time equals zero (dT/dt=0) or the fan-off delay time P2 is based on the cooling system operating time P4. Upper variable cooling differential 191 represents a third variable cooling differential of +2.5° F. based on the previous cooling system operating time P4. According to another embodiment of the present invention, the fan-off delay could alternatively be controlled to continue to operate until a fan-off delay time P2 based on the cooling system duration P4.

Figure 9:
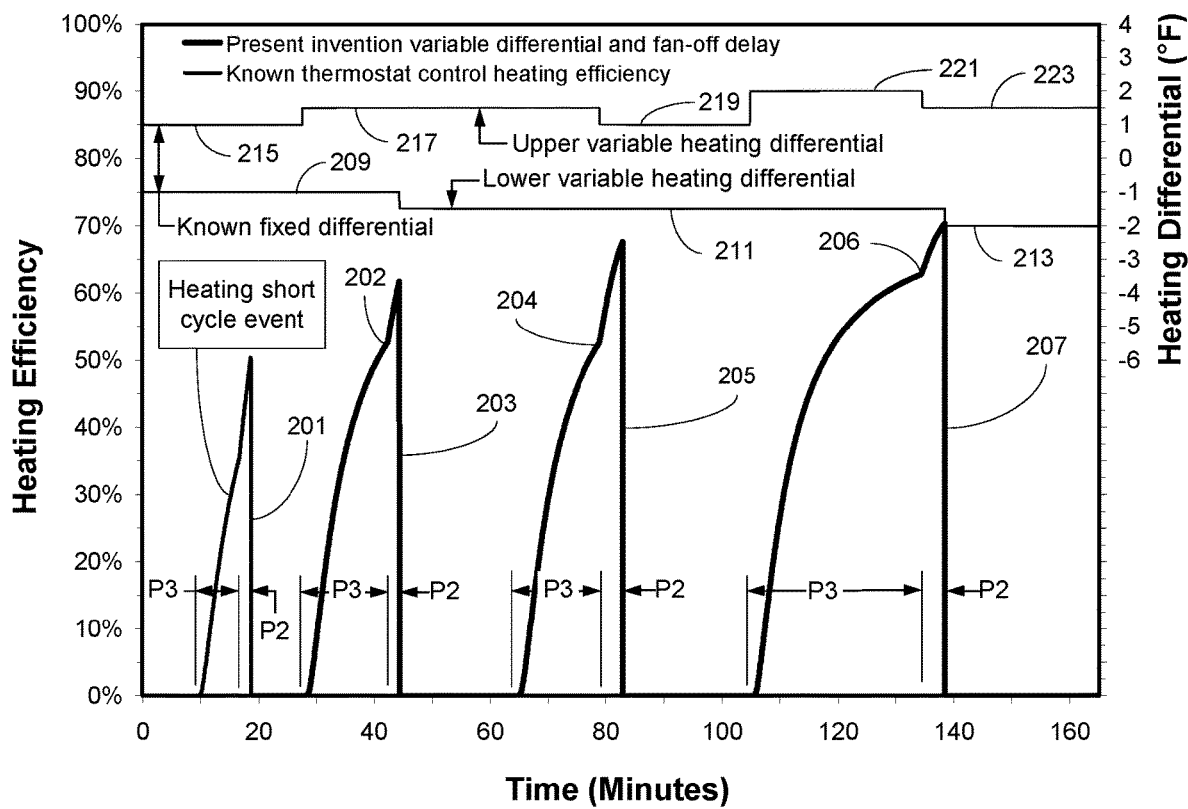
FIG. 9 shows a graph of heating efficiency versus time of operation on the left ordinate and thermostat heating differential versus time of operation on the right ordinate for a gas furnace with heating cycle durations from 8 to 30 minutes.

FIG. 9 shows a graph of heating efficiency versus time of operation on the left ordinate and thermostat heating differential versus time of operation on the right ordinate for a gas furnace with operational times from 8 to 30 minutes. The known control uses a fixed −1° F. lower variable heating differential 209 to turn on the heat source and a fixed +1° F. upper differential 215 to turn off the heat source. The fixed −1° F. lower variable heating differential 209 balances the previous on-cycle to achieve the average thermostat setting.

FIG. 9 shows the heating efficiency curve 201 representing the known control providing an 8-minute heating cycle duration P3. The known control 201 reaches a maximum heating efficiency of 50.3%. According to the present invention, the 8-minute heating cycle duration P3 for curve 201 is diagnosed as a "short cycle" event based on one or more consecutive heating cycle durations P3 of less than or equal to 8 minutes due to fan-on continuously or other faults, where the HVAC system is short cycling as shown in FIG. 13. After detecting one or more consecutive short cycle events, the present invention generates a Fault Detection Diagnostic (FDD) alarm for either a fan-on fault or a short-cycle fault via display, email, text, or other communication method.

According to one embodiment, the present invention can correct the short cycle event by providing a variable differential control based on the previous cycle P3 to lengthen the next on-cycle (curve 203) to improve thermal comfort and energy efficiency and extend the service life of the equipment.

FIG. 9 shows the heating efficiency curve 203 representing the variable differential control according to the present invention with a known −1° F. fixed lower differential 209 to turn on the heat source and a first +1.5° F. upper variable heating differential 217 based on the previous heating cycle duration P3 (for curve 201). The lower variable heating differential 211 will balance the heating on-cycle to achieve the average thermostat setting. The +1.5° F. upper variable heating differential 217 increases the heating cycle duration to 15 minutes (7 minutes longer than curve 201) to avoid short cycling and achieve a higher heating efficiency of 53% at 202 when the heat source is turned off. FIG. 9 shows curve 203 continuing after the heat source is turned off when the CST reaches the upper variable heating differential 217 a first time, and the known control fixed fan-off delay continues to operate for 2 minutes where the heating system achieves an efficiency of 62%. Curve 203 demonstrates one limitation according to the present invention where the variable differential is used to lengthen a current P3 based on a previous P3 to achieve greater heating efficiency.

FIG. 9 curve 205 represents the heating efficiency for a variable differential variable delay thermostat control according to the present invention. Curve 205 operates between a first lower variable heating differential 211 (−1.5° F.) to turn on the heat source and a first upper variable heating differential 217 (+1.5° F.) to turn off the heat source with a 15-minute heating cycle duration P3 and achieves a 53% heating efficiency at 204 when the heat source is turned off. FIG. 9 shows curve 205 continuing to increase after the heat source is turned off due to the heating ventilation fan continuing to operate for a variable fan-off delay time P2 which delivers more heating energy to the conditioned space, and increases the CST above the first upper variable heating differential 217 (+1.5° F.). When the delivered heating energy is less than the building heat losses, the CST decreases to the first fan-off differential or differential offset 219 (+1.0° F.) and the present invention thermostat turns off the fan. The curve 205 fan-off delay time P2 reaches 4 minutes (2 minutes longer than curve 203) and the curve 205 heating efficiency reaches 68% and 9.6% more efficient than curve 203. The present invention shown in curve 205 improves thermal comfort, extends the heating off cycle, and increases heating efficiency. According to another embodiment of the present invention, the fan-off delay could continue to operate until the CST crosses the first fan-off delay differential or differential offset 219 (+1° F.) at least once, or until CST reaches a maximum inflection point where the rate of change of the CST with respect to time equals zero (dT/dt=0). The present invention can also provide an alternative fan-off delay P2 based on the current heat cycle duration P3.

FIG. 9 curve 207 represents the heating efficiency according to the present invention with a second variable upper differential 221 (+2° F.) and first lower variable heating differential 211 (−1.5° F.) based on the previous heating cycle duration P3 shown in curve 205. The first lower variable heating differential 211 (−1.5° F.) turns on the heat source and the heating system operates for 30 minutes (15 minutes longer than curve 205) until the CST crosses the second +2° F. upper variable heating differential 221 where the thermostat turns off the heat source and the heating system efficiency reaches 63% at 206 or 18.9% more efficient than curve 205. FIG. 9 shows curve 207 continuing to increase after the heat source is turned off due to the heating ventilation fan continuing to operate for a variable fan-off delay time P2 which delivers more heating energy to the conditioned space, and increases the CST above the second upper variable heating differential 221 (+2° F.). When the delivered heating energy is less than the building heat losses, the CST decreases to the second fan-off differential or differential offset 223 (+1.5° F.), and the present invention thermostat turns off the fan. The curve 207 fan-off delay heating efficiency reaches 70% which is 3% more efficient than curve 205 and 39% more efficient than curve 201.

According to another embodiment of the present invention, the fan-off delay can continue to operate until the CST crosses the second fan-off delay differential or differential offset 223 (+1.5° F.) at least once or until CST reaches a maximum inflection point where the rate of change of the CST with respect to time equals zero (dT/dt=0). Curve 213 represents a second variable heating lower differential of −2° F. to turn ON the heating system based on the previous heating cycle duration P3.

Figure 10:
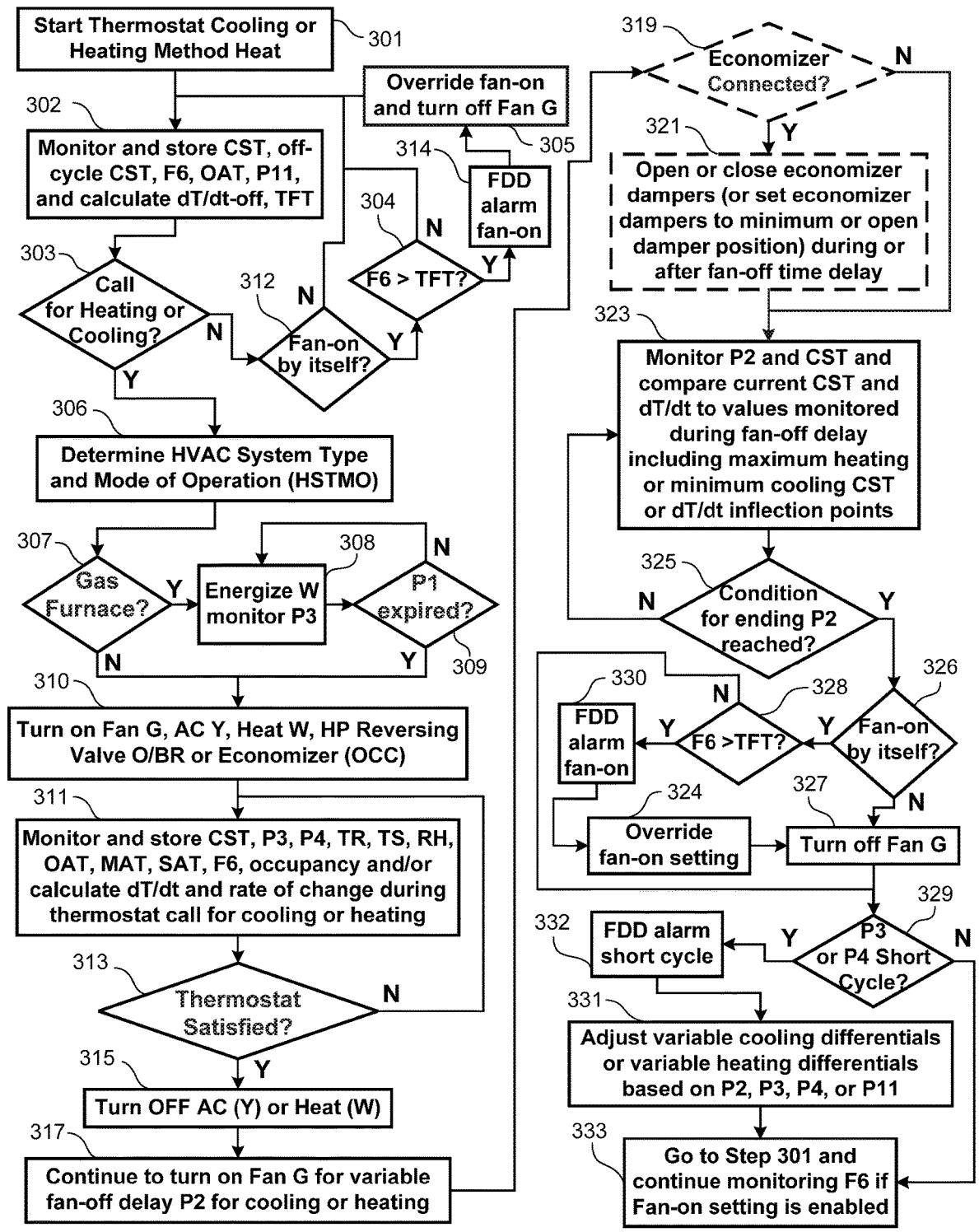
FIG. 10 shows a flow chart describing a thermostat Fault Detection Diagnostic (FDD) method to monitor, detect, report, and override a fan-on setting and turn off an HVAC fan operating longer than a TFT, a FDD method to detect and report a short cycle fault and provide a variable cooling or heating differential or a differential offset to correct a short cycle fault, and a method to determine and provide cooling or heating variable fan-off time delays for a thermostat embodiment of the present invention based on a Conditioned Space Temperature (CST) or a rate of change of the CST with respect to time (dT/dt) measured during a current variable fan-off delay period compared to CST or dT/dt values measured during the current variable fan-off delay period.

FIG. 10 shows a flow chart of a thermostat embodiment of a Fault Detection Diagnostic (FDD) method to monitor, detect, report, and override a fan-on setting and turn off an HVAC fan on by itself longer than a TFT, a FDD method to detect and report a short cycle fault and provide a variable cooling or heating differential or a differential offset to correct a short cycle fault, and a method to enable a variable fan-off delay based on comparing the current CST or the rate of change of CST with respect to time (dT/dt) to values monitored during the fan-off delay according to the present invention. At Step 301 the thermostat starts at least one method: 1) fan-on FDD; 2) a FDD method to detect and report a short cycle fault and provide a variable cooling or heating differential or differential offset based on P2, P3, P4, or P11 to correct a short cycle fault; and 3) variable fan-off delay based on comparing the current CST or dT/dt to values monitored during the fan-off delay including maximum heating or minimum cooling CST or dT/dt inflection points. At Step 302, the thermostat FDD method monitors and stores the CST, calculated rate of change of CST with respect to time (dT/dt), off-cycle CST, a calculated off-cycle rate of change of CST with respect to time (dT/dt-off), off-cycle time P11, the Fan-only "ON" Time (F6), and determines the Threshold Fan-on Time (TFT) based on at least one HVAC parameter selected from the group consisting of: a fan-off delay time P2, a heating cycle duration P3, a cooling cycle duration P4, an off-cycle time P11, a Temperature Split (TS) defined as the difference between a Return Air Temperature (RAT) and a Supply Air Temperature (SAT), a Temperature Rise (TR) defined as the difference between a SAT and RAT, a Conditioned Space Temperature (CST), a rate of change of the CST with respect to time (dT/dt) defined as a difference in temperature between at least two measurements of a CST divided by a difference in time between the same two measurements of the CST, an Outdoor Air Temperature, occupancy sensor signals, and indoor air quality requirements such as Carbon Dioxide ($CO_2$) measurements.

At Step 303, the thermostat determines if there is a call for heating or cooling. At Step 312, the present invention performs the Fault Detection Diagnostics (FDD) method to determine if the fan-on setting is enabled and the HVAC "fan is on by itself?" without a thermostat call for heating or a thermostat call for cooling. If N (No), then the FDD method loops back to Step 302. If Y (Yes), then the FDD method proceeds to Step 304. At Step 304 of FIG. 10, the FDD method determines if the fan-on time (F6) is greater than the TFT. If the F6 is not greater than the TFT, then the FDD method loops back to Step 302 and continues monitoring the TFT and other variables (i.e., CST, P11, OAT, etc.). If the F6 is greater than the TFT, then the FDD method proceeds to Step 314 to provide a FDD alarm fan-on message via display, email, text, or other communication method. The FDD method then proceeds to Step 305, and overrides the fan-on setting to turn off the HVAC fan and loops back to Step 302. As the method loops back to Step 302 and 303, if there is a thermostat call for heating or cooling in step 303, the FDD method proceeds to Steps 306 through Step 333.

The FDD method turns "OFF" a fan accidentally or intentionally turned "ON" by itself for longer than the TFT to avoid wasting energy.

At Step 306 of FIG. 10, the thermostat determines HVAC System Type and Mode of Operation (HSTMO). At Step 307, if a gas furnace is operating, then the thermostat proceeds to Step 308 to energize the gas furnace heat W signal and monitor the heating cycle duration P3. At Step 309, the thermostat checks if the fan-on delay P1 has expired, and if so, then the thermostat proceeds to Step 310. If P1 has not expired, then the thermostat loops back to Step 308 to continue energizing the gas furnace heat W signal and monitor the heating cycle duration P3. In one embodiment of the present invention for a gas furnace, the fan-on delay P1 allows the furnace Heat Exchanger (HX) to reach operating temperature before the Fan G wire is energized which in many systems energizes the HVAC fan to a higher speed in Step 310. With the addition of a high-voltage relay in the RTU connected to the high-speed tap on the HVAC fan motor and activated by the Fan G wire, the HVAC fan can be switched to high speed regardless of the default fan speed settings controlled by the split or packaged system control board. At Step 307, if a gas furnace is not connected or not operating, then the thermostat proceeds to Step 310 to energize the thermostat Fan G terminal to energize the ventilation fan (to a higher speed for an HVAC system with a multi-speed fan) or energize the thermostat Y terminal to energize the AC/HP compressor or energize (or continue energizing) the thermostat heat source W terminal or energize the thermostat O/BR terminal to energize the heat pump reversing valve or energize the OCC output to signal to the economizer the dampers are under economizer control. Without an OCC signal energized, the dampers are kept closed. In this way, the dampers are closed from the end of the last heating or cooling cycle until the next call for heating or cooling. Alternatively, the method may include turning on the OCC Out, or providing the wired low-voltage or digital signal or the wireless signal to open the economizer dampers during or after the fan-off delay.

At Step 311 of FIG. 10, the thermostat monitors and stores (or continues to monitor and store) cooling or heating system parameters including at least one parameter selected from a group consisting of: CST, the P3, the P4, the TR, the TS, the RH, the OAT, the MAT, the SAT, the F6 (fan-on time), the CO2, an occupancy, and/or calculate dT/dt and the rate of change of these variables. If Step 313, is Yes (Y) the thermostat is satisfied, then the method proceeds to Step 315 to turn off the cool source AC (Y) or heat source Heat (W) and the heating or cooling system operating time has ended. If Step 313, is No (N) the thermostat is not satisfied, then the method loops back to Step 311. At Step 317, the thermostat energizes or continues to energize or turn on the Fan G signal for a variable fan-off delay for cooling or heating.

At Step 319 of FIG. 10, the thermostat optionally determines whether or not an economizer is connected to the HVAC system as shown in FIG. 3. If the economizer is connected, the method proceeds to Step 321 and turns off (or turns on) the Occupancy sensor Output (OCC Out) or sends a low-voltage wired or wireless signal to the economizer or economizer actuator to open or close the economizer dampers (or set the economizer dampers to a minimum or open damper position) during or after the variable fan-off delay. At Step 323, the thermostat monitors the variable fan-off delay time P2 and the CST and compares the current CST to CST values monitored during the fan-off delay including maximum during heating or minimum values and confidence interval tolerances during cooling CST or dT/dt inflection points.

At Step 325 of FIG. 10, the thermostat either loops back to Step 323 to continue to monitor the CST or terminates the fan-off delay based on at least one condition selected from the list consisting of: 1) CST reaches a cooling inflection point where the current CST is greater than a minimum CST monitored during the fan-off delay (dT/dt=0) plus or minus a confidence interval, 2) CST reaches a heating inflection point where the current CST is less than a maximum CST monitored during the fan-off delay (dT/dt=0) plus or minus a confidence interval.

At Step 326 of FIG. 10 the FDD method checks if the fan-on setting is enabled and the HVAC fan is continuing to be turned on by itself after the fan-off delay (or after the thermostat call for cooling or heating if no fan-off delay is present). If Step 326 is No (N), then the FDD method proceeds to Step 327 of FIG. 10, and the FDD method de-energizes the thermostat Fan G terminal to turn off the fan relay and turn OFF the HVAC fan. If Step 326 is Yes (Y), then the FDD method proceeds to Step 328, and if No (N), fan-on time (F6) is NOT greater than TFT, then the FDD method proceeds to Step 329. If Step 328 is Yes (Y), fan-on time (F6) is greater than TFT, then the FDD method proceeds to Step 330 to report a FDD alarm fan-on message, proceeds to Step 324 to override the fan-on setting, proceeds to Step 327 to turn off Fan G and turn off the HVAC fan, and proceeds to Step 329. At Step 329, the previous cooling cycle durations P4 or previous heating cycle durations P3 are examined to determine if the system is short cycling. If Yes (Y), at Step 329, then the FDD method proceeds to Step 332 to report a FDD alarm short cycle message. The FDD method then proceeds to Step 331, where the FDD method can adjust the variable cooling differentials based on the fan-off delay P2, cooling cycle duration P4 or off-cycle time P11, or adjust the variable heating differentials based on the fan-off delay P2, the heating cycle duration P3 or off-cycle time P11. If Step 329 is No (N) P3 heating short cycle or No (N) P4 cooling short cycle, then the FDD method proceeds to Step 333. At Step 333, the FDD method goes back to Step 301 to continue monitoring F6 if fan-on setting is enabled and the HVAC fan is on by itself.

Figure 11:
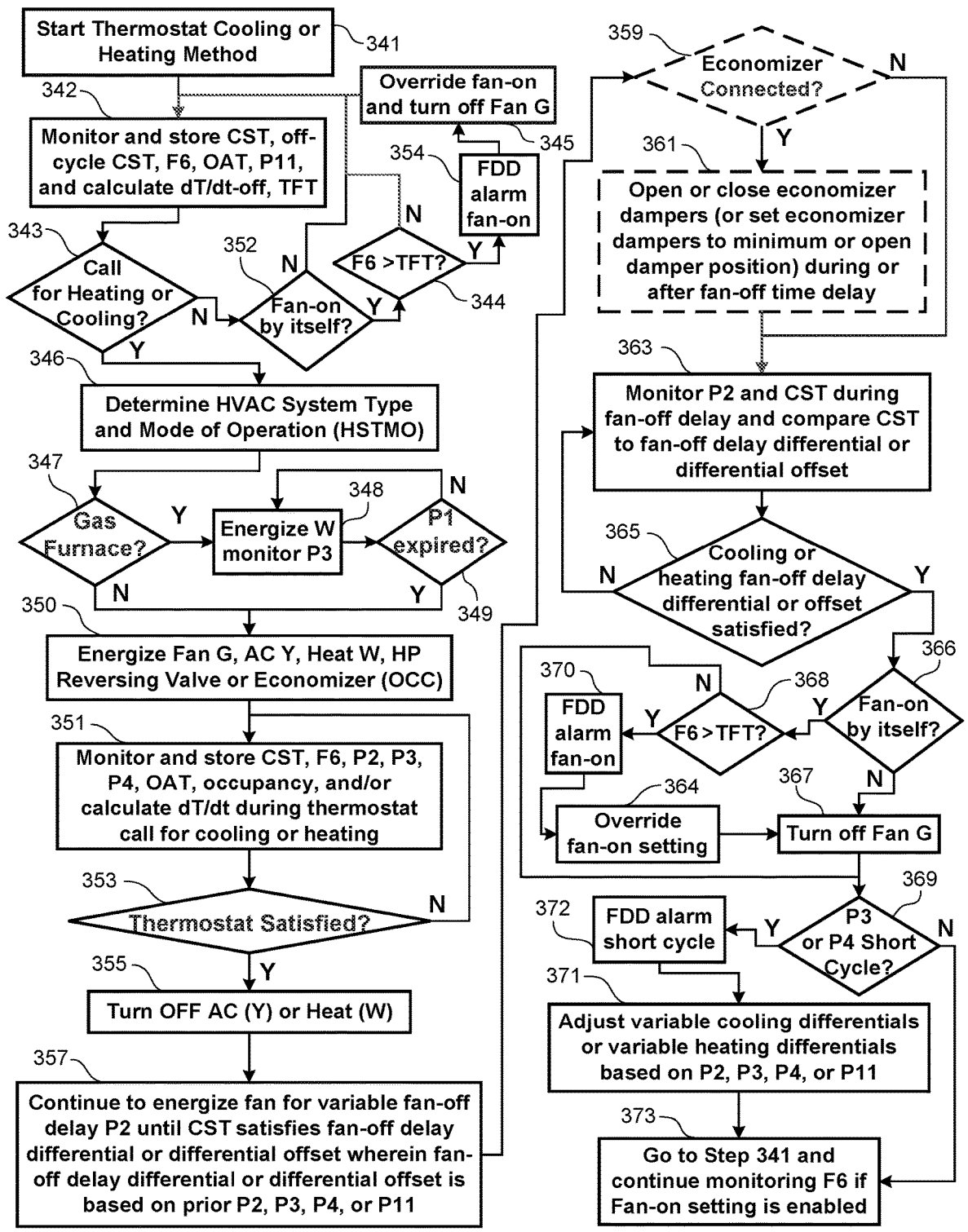
FIG. 11 shows a flow chart describing a thermostat Fault Detection Diagnostic (FDD) method to monitor, detect, report, and override a fan-on setting and turn off an HVAC fan operating longer than a TFT, a FDD method to detect and report a short cycle fault and provide a variable cooling or heating differential or a differential offset to correct a short cycle fault, and a method for determining and implementing cooling or heating variable fan-off time delays for a thermostat embodiment of the present invention based on a monitoring P2 and CST during the fan-off delay and comparing the CST to a fan-off delay differential or differential offset.

FIG. 11 shows a flow chart of a thermostat embodiment of a Fault Detection Diagnostic (FDD) method to monitor, detect, report, and override a fan-on setting and turn off an HVAC fan on by itself longer than a TFT, a FDD method to detect and report a short cycle fault and provide a variable cooling or heating differential or differential offset based on P2, P3, P4, or P11 to correct a short cycle fault, and a method to enable a variable fan-off delay based on a Conditioned Space Temperature (CST) measured during a current variable fan-off delay period compared to CST values measured during the current variable fan-off delay period according to the present invention. At Step 341 the thermostat starts at least one method: 1) fan-on FDD; 2) variable cooling or heating differential based on P2, P3, P4, or P11; 3) variable fan-off delay based on a fan-off delay differential or a fan-off delay differential offset. At Step 342, the thermostat monitors and stores the CST, off-cycle CST, dT/dt-off, off-cycle time P11, the Fan-only "ON" time (F6), and determines the Threshold Fan-on Time (TFT) based on at least one HVAC parameter selected from the group consisting of: P2, P3, P4, P11, TS, TR, CST, dT/dt, OAT, occupancy sensor signals, and indoor air quality requirements such as CO2 concentration measurements. At Step 343, the thermostat determines if there is a call for heating or cooling.

At Step 352 of FIG. 11, the present invention performs the Fault Detection Diagnostics (FDD) method to determine if the fan-on setting is enabled and the HVAC "fan is on by itself?" without a thermostat call for heating or a thermostat call for cooling. If N (No), then the FDD method loops back to Step 342. If Y (Yes), then the FDD method proceeds to Step 344. At Step 344 of FIG. 11, the FDD method determines if the fan-on time F6 is greater than the TFT. If the F6 is not greater than the TFT, then the FDD method loops back to Step 342 and continues monitoring the F6, TFT and other variables (i.e., CST, P11, OAT, etc.). If the F6 is greater than the TFT, then the FDD method proceeds to Step 354 to provide a FDD alarm fan-on message via display, email, text, or other communication method. The FDD method then proceeds to Step 345, and overrides the fan-on setting to turn off the HVAC fan and loops back to Step 342. As the method loops back to Step 342 and 343, if there is a thermostat call for heating or cooling in step 343, the FDD method proceeds to Steps 346 through Step 373. At Step 373 the method returns to step 341 to continue monitoring F6 if the fan-on setting is enabled and the fan is on by itself.

At Step 346 of FIG. 11, the thermostat determines HVAC System Type and Mode of Operation (HSTMO). At Step 347, if a gas furnace is operating, then the thermostat proceeds to Step 348 to energize the gas furnace heat W signal and monitor the heating cycle duration P3. At Step 349, the thermostat checks if the fan-on delay P1 has expired, and if so, then the thermostat proceeds to Step 350. If P1 has not expired, then the thermostat loops back to Step 348 to continue energizing the gas furnace heat W signal and monitor the heating cycle duration P3. In one embodiment of the present invention for a gas furnace, the fan-on delay P1 allows the furnace Heat Exchanger (HX) to reach operating temperature before the Fan G wire is energized which in many systems energizes the HVAC fan to a higher speed in Step 350. With the addition of a high-voltage relay in the RTU connected to the high-speed tap on the HVAC fan motor and activated by the Fan G wire, the HVAC fan can be switched to high speed regardless of the default fan speed settings controlled by the split or packaged system control board. At Step 347, if a gas furnace is not connected or not operating, then the thermostat continues to Step 350.

At Step 350, the thermostat energizes the thermostat G terminal to energize the ventilation fan or the thermostat Y terminal to energize the AC/HP compressor or energize (or continue energizing) the thermostat W terminal to energize the heat source or the thermostat O/BR terminal to energize the heat pump reversing valve.

At Step 351 of FIG. 11, the thermostat FDD method monitors and stores the CST during the thermostat call for cooling or heating. The FDD method also monitors and stores F6, P2, P3, P4, OAT, occupancy, and/or calculates dT/dt during the thermostat call for cooling or the thermostat call for heating, and the rate of change of these HVAC parameters. At Step 353, if Yes (Y) the thermostat is satisfied, then the FDD method proceeds to Step 355, and the thermostat FDD method turns off the AC (Y) to de-energize the cool source AC/HP compressor or turns off the Heat (W) to de-energize the heat source. If Step 353, is No (N) the thermostat is not satisfied, then the method loops back to Step 351.

At Step 357 of FIG. 11, the thermostat FDD method continues to energize the HVAC fan for a heating or a cooling variable fan-off delay P2 until CST satisfies the fan-off delay differential or differential offset wherein the fan-off delay differential or differential offset are based on the duration of a prior fan-off delay P2, a prior duration of a heating cycle P3, a prior duration of a cooling cycle P4 or a prior duration of an off-cycle P11.

At Step 359 of FIG. 11, the thermostat optionally determines whether or not an economizer is connected to the HVAC system as shown in FIG. 3. If the economizer is connected to an HVAC system, the method proceeds to Step 361 and turns off the Occupancy sensor Output (OCC Out) or sends a low-voltage wired or wireless signal to the economizer or economizer actuator to open or close the economizer dampers (or set the economizer dampers to a minimum or open damper position) during the variable fan-off delay.

At Step 363 of FIG. 11, the thermostat monitors P2 and CST during fan-off delay and compares the CST to the fan-off delay differential or the differential offset.

At Step 365 of FIG. 11, the thermostat either loops back to 363 to continue the fan-off delay and monitoring or terminates the fan-off delay based on at least one condition selected from the list consisting of: 1) CST crosses a fan-off delay differential, 2) CST crosses a fan-off delay differential offset.

At Step 366 of FIG. 11 the thermostat FDD method checks if the fan-on setting is enabled and the HVAC fan is continuing to be turned on by itself after the fan-off delay (or after the thermostat call for cooling or heating if no fan-off delay is present). If Step 366 is No (N), then the FDD method proceeds to Step 367 of FIG. 11, and the thermostat FDD method de-energizes the thermostat Fan G terminal to turn off the fan relay and turn OFF the HVAC fan. If Step 366 is Yes (Y), then the FDD method proceeds to Step 368, and if No (N), fan-on time (F6) is NOT greater than TFT, then the FDD method proceeds to Step 369. If Step 368 is Yes (Y), fan-on time (F6) is greater than TFT, then the FDD method proceeds to Step 370 to report a FDD alarm fan-on message, proceeds to Step 364 to override the fan-on setting, proceeds to Step 367 to turn off the Fan G and turn off the HVAC fan, and proceeds to Step 369. At Step 369, the previous cooling cycle durations P4 or previous heating cycle durations P3 are examined to determine if the system is short cycling. If Yes (Y), at Step 369, then the FDD method proceeds to Step 372 to report a FDD alarm short cycle message. The FDD method then proceeds to Step 371, where the FDD method can adjust the variable cooling differentials based on the fan-off delay time P2, cooling cycle duration P4, or off-cycle time P11, or adjust the variable heating differentials based on the fan-off delay P2, the heating cycle duration P3, or off-cycle time P11. If Step 369 is No (N) P3 heating short cycle or No (N) P4 cooling short cycle, then the FDD method proceeds to Step 373. At Step 373, the FDD method goes back to Step 341 to continue monitoring F6 if fan-on setting is enabled and the HVAC fan is on.

Figure 12:
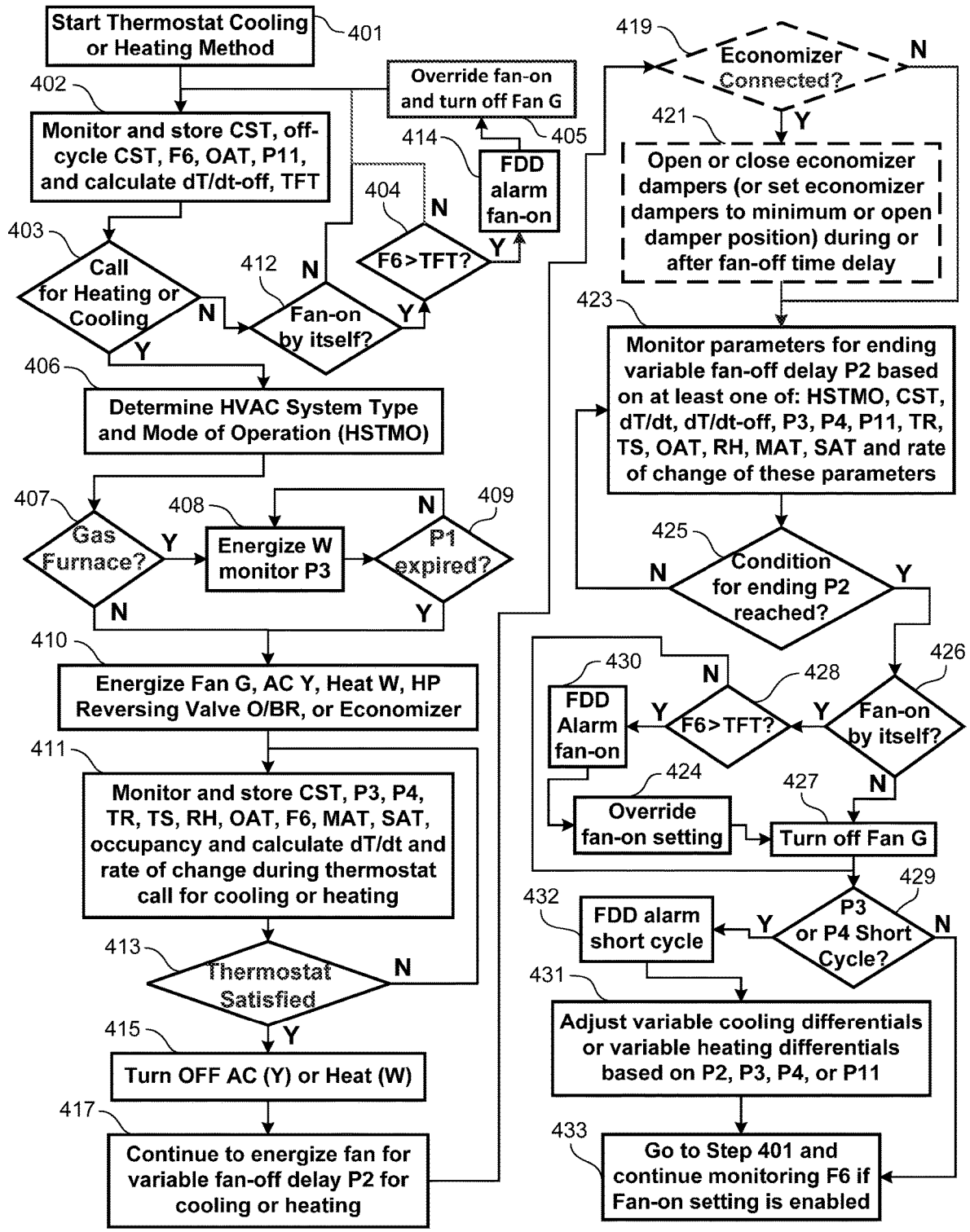
FIG. 12 shows a flow chart describing a thermostat Fault Detection Diagnostic (FDD) method to monitor, detect, report, and override a fan-on setting and turn off an HVAC fan operating longer than a TFT, a FDD method to detect and report a short cycle fault and provide a variable cooling or heating differential or a differential offset to correct a short cycle fault, and a method for determining and implementing cooling or heating variable fan-off time delays for a thermostat embodiment of the present invention.

FIG. 12 shows a flow chart of a thermostat embodiment of a Fault Detection Diagnostic (FDD) method to monitor, detect, report, and override a fan-on setting and turn off an HVAC fan operating longer than a TFT, a FDD method to detect and report a short cycle fault and provide a variable cooling or heating differential or differential offset based on P2, P3, P4, or P11 to correct a short cycle fault, and a method to enable a variable fan-off delay based on at least one HVAC parameter according to the present invention. The flow chart describes a method for determining and implementing cooling or heating variable fan-off delay P2 for a thermostat embodiment of the present invention based on at least one HVAC parameter selected from the group consisting of: a HVAC System Type and Mode of Operation (HSTMO), the CST, the dT/dt, the dT/dt-off, the RH, the heating cycle duration P3, the cooling cycle duration P4, an off-cycle time P11, a cooling Temperature Split (TS), a heating Temperature Rise (TR), Outdoor Air Temperature (OAT), Mixed Air Temperature (MAT), Supply Air Temperature (SAT), or a rate of change of any of these HVAC parameters with respect to time.

At Step 401 of FIG. 12, the thermostat starts at least one method: 1) fan-on FDD; 2) variable differential based on P2, P3, P4, or P11; 4) variable fan-off delay based on at least one HVAC parameter (described in Step 423). At Step 402, the thermostat FDD method monitors and stores the CST, the off-cycle CST, the dT/dt-off, the off-cycle time P11, the Fan-only "ON" Time (F6), and determines the Threshold Fan-on Time (TFT) based on at least one HVAC parameter selected from the group consisting of: P2, P3, P4, P11, TS, TR, CST, dT/dt, OAT, occupancy sensor signals, and indoor air quality requirements such as CO2 measurements. At Step 403, the thermostat determines if there is a call for heating or cooling.

At Step 412 of FIG. 12, the present invention performs the FDD method to determine if the fan-on setting is enabled and the HVAC "fan is on by itself?" without a thermostat call for heating or a thermostat call for cooling. If N (No), then the FDD method loops back to Step 402. If Y (Yes), then the FDD method proceeds to Step 404. At Step 404 of FIG. 12, the FDD method to determines if F6 is greater than the TFT. If the F6 is not greater than the TFT, then the FDD method loops back to Step 402. If the F6 is greater than the TFT, then the FDD method proceeds to Step 414 to report a FDD alarm fan-on message via display, email, text, or other communication method, and proceeds to Step 405, and overrides the fan-on setting and turns "OFF" the fan G and turns off the HVAC fan, and loops back to Step 402. As the method loops back to Step 402 and 403, if there is a thermostat call for heating or cooling in step 403, the FDD method proceeds to Steps 406 through Step 433.

At Step 406 of FIG. 12, the thermostat determines the HVAC System Type and Mode of Operation (HSTMO). At Step 407, if a gas furnace is operating, then the thermostat proceeds to Step 408 to energize the gas furnace heat W signal and monitor the heating cycle duration P3. At Step 409, the thermostat checks if the fan-on delay P1 has expired, and if so, then the thermostat proceeds to Step 410. If P1 has not expired, then the thermostat loops back to Step 408 to continue energizing the gas furnace heat W signal and monitor the heating cycle duration P3. In one embodiment of the present invention for a gas furnace, the fan-on delay P1 allows the furnace Heat Exchanger (HX) to reach operating temperature before the Fan G wire is energized which in many systems energizes the HVAC fan to a higher speed in Step 410. With the addition of a high-voltage relay in the RTU connected to the high-speed tap on the HVAC fan motor and activated by the Fan G wire, the HVAC fan can be switched to high speed regardless of the default fan speed settings controlled by the split or packaged system control board. At Step 407, if a gas furnace is not connected or not operating, then the thermostat proceeds to Step 410 to energize the thermostat Fan G terminal to energize the ventilation fan (to a higher speed for an HVAC system with a multi-speed fan) or energize the thermostat Y terminal to energize the AC/HP compressor or energize (or continue energizing) the thermostat heat source W terminal or energize the thermostat O/BR terminal to energize the heat pump reversing valve.

At Step 410, the thermostat energizes the thermostat Fan G terminal to energize the ventilation fan or the thermostat AC Y terminal to energize the AC/HP compressor or the thermostat Heat W terminal to energize the heat source or the thermostat O/BR terminal to energize the heat pump reversing valve.

At Step 411 of FIG. 12, the thermostat monitors and stores the CST, the duration of thermostat call for heating (P3), the duration of the thermostat call for cooling (P4), the Temperature Rise (TR), the Temperature Split (TS), the Relative Humidity (RH, the OAT, the fan-on time (F6), the Mixed Air Temperature (MAT), the Supply Air Temperature (SAT), the occupancy and calculates the rate of change of the CST with respect to time (dT/dt) and the rate of change of these HVAC parameters. At Step 413, if Yes (Y) the thermostat is satisfied, then the FDD method proceeds to Step 415, and the thermostat FDD method turns off the AC (Y) to de-energize the cool source AC/HP compressor or turns off the Heat (W) to de-energize the heat source. If Step 413, is No (N) the thermostat is not satisfied, then the method loops back to Step 411. At Step 417, the thermostat continues to energize or turn on the Fan G for a cooling or heating variable fan-off delay P2.

At Step 419 of FIG. 12, the thermostat optionally determines whether or not an economizer is connected to the HVAC system as shown in FIG. 3. If the economizer is connected to an HVAC system, the method proceeds to Step 421 and turns off the occupancy sensor output (OCC Out) output or sends a low-voltage wired or wireless signal to the economizer or economizer actuator to open or close the economizer dampers (or set the economizer dampers to a minimum or open damper position) during the variable fan-off delay.

At Step 423 of FIG. 12, the thermostat monitors parameters for terminating variable fan-off delay P2 based on at least one parameter selected from the group: the HSTMO, the CST, the dT/dt, the dT/dt-off, the RH, the P3, the P4, the P11, the T R, the TS, the OAT, the MAT, the SAT, and the rate of change of these HVAC parameters.

At Step 425 of FIG. 12, the thermostat either loops back to Step 423 to continue monitoring the CST and other HVAC parameters or terminates the fan-off delay based on at least one condition selected from the group consisting of: 1) CST reaches a cooling inflection point where the current CST is greater than a minimum CST monitored during the fan-off delay (dT/dt=0) plus or minus a confidence interval, 2) CST reaches a heating inflection point where the current CST is less than a maximum CST monitored during the fan-off delay (dT/dt=0) plus or minus a confidence interval, 3) cooling CST is greater than the off-cycle rate of change of CST with respect to time (dT/dt-off) times a confidence interval tolerance ($C_2$), 4) heating CST is less than the off-cycle rate of change of CST with respect to time (dT/dt-off) times a confidence interval tolerance ($C_1$), 5) RH is greater than a threshold for cooling, 6) cooling P2 based on P3 has expired, 7) heating P2 based on P4 has expired, 8) TR for heating is below the target TR, 9) TS for cooling is below the target TS, 10) OAT below a minimum for heating or above a maximum for cooling, 11) MAT is too low for heating or MAT is tool high for cooling, or 12) SAT is too low for heating or too high for cooling.

At Step 426 of FIG. 12 the thermostat FDD method checks if the fan-on setting is enabled and the HVAC fan is continuing to be turned on by itself after the fan-off delay (or after the thermostat call for cooling or heating if no fan-off delay is present). If Step 426 is No (N), then the FDD method proceeds to Step 427 of FIG. 12, and the thermostat FDD method de-energizes the thermostat Fan G terminal to turn off the fan relay and turn OFF the HVAC fan. If Step 426 is Yes (Y), then the FDD method proceeds to Step 428, and if No (N), fan-on time (F6) is NOT greater than TFT, then the FDD method proceeds to Step 429. If Step 428 is Yes (Y), fan-on time (F6) is greater than TFT, then the FDD method proceeds to Step 430 to report a FDD alarm fan-on message, proceeds to Step 424 to override the fan-on setting, proceeds to Step 427 to turn off Fan G and turn off the HVAC fan, and proceeds to Step 429. At Step 429, the previous cooling cycle durations P4 or previous heating cycle durations P3 are examined to determine if the system is short cycling. If Yes (Y), at Step 429, then the FDD method proceeds to Step 432 to report a FDD alarm short cycle message. The FDD method then proceeds to Step 431, where the FDD method can adjust the variable cooling differentials based on the fan-off delay time P2, cooling cycle duration P4, or off-cycle time P11, or adjust the variable heating differentials based on the fan-off delay P2, the heating cycle duration P3, or off-cycle time P11. If Step 429 is No (N) P3 heating short cycle or No (N) P4 cooling short cycle, then the FDD method proceeds to Step 433. At Step 433, the FDD method goes back to Step 401 to continue monitoring F6 if the fan-on setting is enabled and the HVAC fan is on by itself.

FIG. 13 shows curve 451 representing the total HVAC system power (kW) versus time of operation for a known thermostat fan control with continuous fan "ON" causing over ventilation (and excess outdoor air for systems with economizers), constant fan power, short cycling, and increased HVAC power consumption (i.e., curve 451 shows four HVAC cycles during 60 minutes of fan-only "ON" time F6). FIG. 13 curve 451 also shows an embodiment of the present invention thermostat fan control with Fault Detection Diagnostics (FDD) determining that a fan-on setting is enabled and the HVAC fan is turned "ON" by itself, and when the fan-on time F6 is greater than or equal to the Threshold Fan-on Time (TFT), the present invention provides a FDD alarm fan-on message and overrides the fan-on setting and turns "OFF" the fan to reduce HVAC system power consumption (as shown by curve 453). If a thermostat call for cooling or heating occurs during the fan-only "ON" time F6, then the FDD method can temporarily pause monitoring F6 and continue monitoring F6 when fan-only operation continues, or in another embodiment monitor F6 throughout the HVAC "ON" time and fan-only "ON" time. Either way, if the HVAC fan is operating continuously longer than the TFT (i.e., F6≥TFT) with or without a thermostat call for cooling or heating, then the present invention will override the fan-on setting and de-energize the HVAC fan as shown by curve 453. During the cooling or heating season, a fan accidentally turned to the "ON" position continuously will cause over ventilation and increase the thermostat call for cooling or heating which will increase HVAC energy consumption (as shown by curve 451). The present invention represented will determine whether or not the fan is turned ON by itself longer than the TFT (as shown by curve 451), if the building is occupied or unoccupied. The FDD method checks if the Fan "ON" time F6 is greater than or equal to the TFT which will vary depending on monitored HVAC parameters. In one embodiment for an educational building, the TFT might be set to 60 minutes, and adjustable from 60 minutes based on HVAC parameters to provide outdoor air ventilation in a classroom to meet the ASHRAE 62.1 Ventilation for Acceptable Indoor Air Quality requirements. The TFT is adjusted based on at least one HVAC parameter selected from the group consisting of: a fan-off delay time P2, a heating cycle duration P3, a cooling cycle duration P4, an off-cycle time P11, a Temperature Split (TS) defined as the difference between a Return Air Temperature (RAT) and a Supply Air Temperature (SAT), a Temperature Rise (TR) defined as the difference between a SAT and RAT, a Conditioned Space Temperature (CST), a rate of change of the CST with respect to time (dT/dt) defined as a difference in temperature between at least two measurements of a CST divided by a difference in time between the same two measurements of the CST, an Outdoor Air Temperature, occupancy sensor signals, and indoor air quality requirements.

Figure 14:
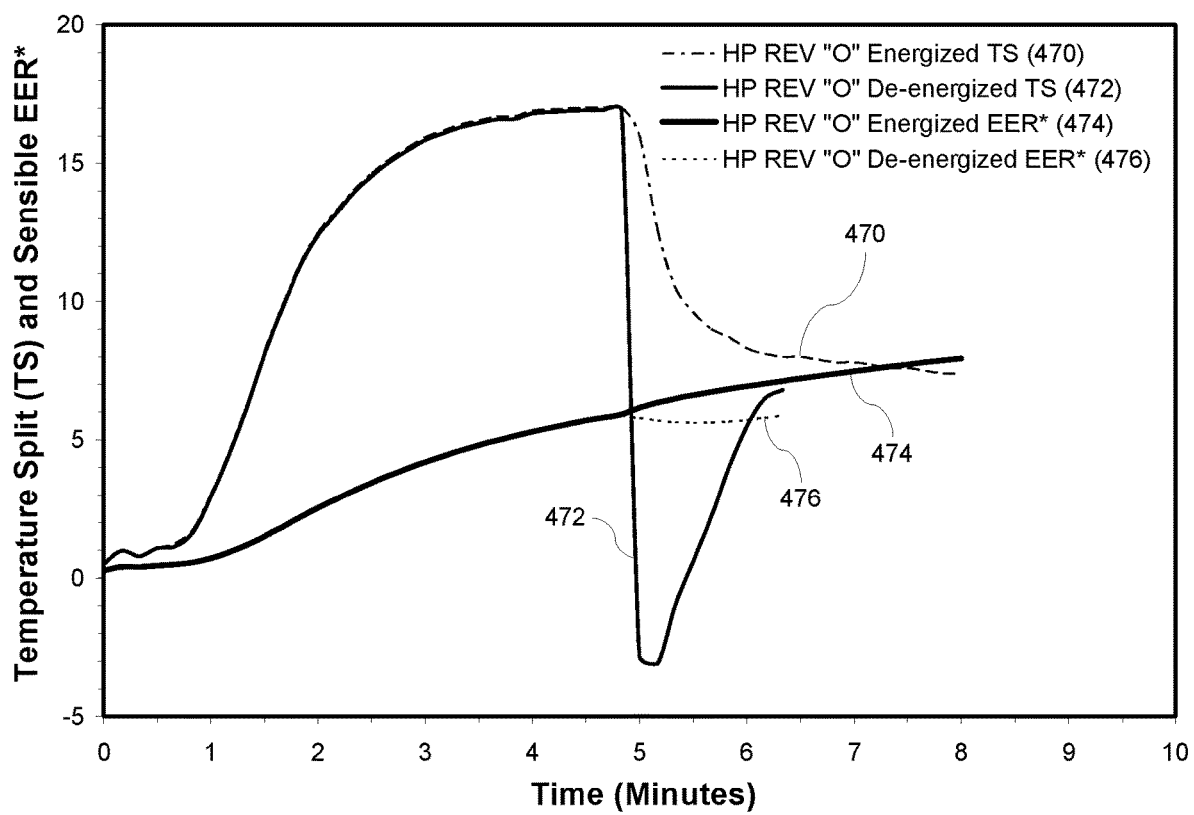
FIG. 14 shows a graph of cooling Temperature Split (TS) curve and the sensible cooling application Energy Efficiency Ratio* (EER) versus time of operation for a heat pump with a reversing valve energized in cooling mode for a 5-minute compressor cooling cycle duration P4 and de-energized at the end of the compressor cooling cycle duration P4 and the same heat pump with the reversing valve energized throughout the compressor cooling cycle duration P4 plus fan-off delay time P2 according to an embodiment of the present invention.

FIG. 14 shows a graph of a cooling Temperature Split (TS) (curve 472) and sensible cooling application EER* (curve 476) versus time of operation for a heat pump with a reversing valve normally energized in cooling mode for a 5-minute compressor cooling cycle duration P4 and de-energized by the thermostat at the end of the compressor operational time P4. Curve 472 shows how the TS is reduced from 16.7° F. to minus 3.1° F. approximately 10 seconds after the reversing valve is de-energized. When de-energized, the reversing-valve spring decompresses and blocks the capillary tube allowing high pressure and high temperature refrigerant vapor to flow to the evaporator coil, increasing the coil temperature from approximately 40° F. to approximately 86° F., which immediately increases the supply air temperature, and reduces temperature split and eliminates most of the cooling stored in the evaporator at the end of the compressor cooling cycle duration P4. Curve 476 shows the sensible EER* slightly declining from 5.9 from the end of P4 to 5.87 at the end of an 80-second time delay due to loss of cooling capacity after the reversing valve is de-energized. Curve 470 shows a gradual TS decrease from 17° F. to 7.4° F. during the 3-minute fan-off delay time P2 when the reversing valve is not de-energized. Curve 474 shows the sensible EER* increasing by 35% from 5.9 to 7.94 with the reversing valve energized continuously throughout the compressor cooling cycle duration P4 and continuing to be energized throughout the fan-off delay time P2. The present invention thermostat maintains a continuous HP reversing valve signal throughout a cooling cycle duration plus a fan-off delay duration or a heating cycle duration plus a fan-off delay duration to provide maximum cooling or heating capacity and energy efficiency. The fan-off delay duration can be a variable fan-off delay duration.

As noted above, the present invention solves unresolved needs by providing a FDD alarm fan-on message and/or overriding a fan-on setting and turning off an HVAC fan turned on by itself longer than a TFT in order to reduce energy use and carbon dioxide emissions, improve thermal comfort, and extend the service life of HVAC equipment and fan blower motor. The present invention also provides variable cooling or heating differentials to reduce short cycling and improve energy efficiency and provide a FDD alarm short cycle message. The present invention uses thermostat temperature measurements of the CST during a current variable fan-off delay period compared to CST values measured during the current cooling variable fan-off delay to continue energizing the fan relay and operate the cooling ventilation fan for a variable fan-off delay to recover DX refrigerant cooling energy stored in the evaporator coil and evaporative cooling energy stored on the evaporator coil as condensed water vapor and deliver additional sensible cooling energy to the conditioned space to increase occupant comfort, improve energy efficiency and extend the AC compressor off cycle. Similarly, the present invention also solves an unresolved need by using thermostat temperature measurements of the CST during a current heating variable fan-off delay period compared to CST values measured during the current variable fan-off delay period to continue energizing the fan relay and operate the heating ventilation fan for a variable fan-off delay to recover heat stored in the heat exchanger and deliver additional heating energy to the conditioned space to increase occupant comfort, improve energy efficiency and extend the heating equipment off cycle. The present invention thermostat can also wait a first period of time P1 while a heating system is turning on a heater and warming up a heat exchanger and operating an HVAC fan to circulate air through the heating system and after the P1, energizing a thermostat G terminal to energize a fan relay and switch the HVAC fan to a higher speed to increase airflow and heating energy delivered to the conditioned space during the thermostat call for heating to satisfy the thermostat call for heating in less time to reduce heating energy use. The present invention can also turn off a heating or a cooling system and continue to operate an HVAC fan until the CST reaches a fan-off delay differential or differential offset or an Inflection Point (IP) where a rate of change of the CST with respect to time (dT/dt) equals zero plus or minus a confidence interval tolerance. In some embodiments the variable fan-off delay is initiated after the cooling or heating thermostat setpoint temperature has been reached.

The present invention does not turn off the fan relay by comparing the CST to the LMBT the first time the CST crosses the LMBT and does not compare the CST to a fan-cooling start temperature plus a small fixed value.

While the invention herein disclosed has been described by means of specific embodiments and applications thereof, numerous modifications and variations could be made thereto by those skilled in the art without departing from the scope of the invention set forth in the claims.

I claim:

1. A method for controlling a Heating Ventilating Air Conditioning (HVAC) system with a thermostat, the method comprising at least one action selected from the group consisting of:

the thermostat performing a fan-only Fault Detection Diagnostic (FDD) procedure comprising the thermostat monitoring a HVAC fan operating time, detecting that the HVAC fan is controlled by a fan-on setting, determining that the HVAC fan operating time is greater than a Threshold Fan-on Time (TFT), and performing at least one action selected from the group consisting of: providing a FDD alarm fan-on message, and overriding the fan-on setting and turning off the HVAC fan;

the thermostat turning on or continuing to turn on the HVAC fan and continue operating the HVAC fan after the end of the thermostat call for cooling or the thermostat call for heating for a variable fan-off delay time P2 where the variable fan-off delay time P2 is discontinued based on at least one method selected from the group consisting of:

comparing a current Conditioned Space Temperature (CST) to a previously monitored and stored CST value measured during a current variable fan-off delay after the thermostat call for cooling has ended or after the thermostat call for heating has ended, determining that a rate of change of the CST with respect to time (dT/dt) has reached an Inflection Point (IP) of zero plus or minus a confidence interval tolerance one or more times where the rate of change of the CST with respect to time dT/dt is defined as a difference in temperature between at least two measurements of the CST divided by a difference in time between the at least two measurements of the CST, determining that the CST crosses a cooling or a heating fan-off delay differential or a differential offset one or more times, determining that the rate of change of the CST with respect to time (dT/dt) measured during a current cooling variable fan-off delay is greater than a previous cooling off-cycle rate of change of the CST with respect to time (dT/dt-off), and determining that the rate of change of the CST with respect to time (dT/dt) measured during a current heating variable fan-off delay is less than a previous heating off-cycle rate of change of the CST with respect to time (dT/dt-off).

2. The method of claim 1, wherein the TFT is adjustable based on at least one HVAC parameter selected from the group consisting of: the variable fan-off delay time P2, a heating cycle duration P3, a cooling cycle duration P4, an off-cycle time P11, the CST, the dT/dt, a Temperature Split (TS) defined as the difference between a Return Air Temperature (RAT) and a Supply Air Temperature (SAT), a Temperature Rise (TR) defined as the difference between a SAT and RAT, an Outdoor Air Temperature, a Carbon Dioxide ($CO_2$) measurement, an indoor air quality requirement, and an occupancy sensor signal.

3. The method of claim 1, wherein the TFT is at least one time period selected from the group consisting of: 60 minutes, and adjustable from 60 minutes based on HVAC parameters to provide outdoor air ventilation based on occupancy or to meet minimum acceptable indoor air quality requirements.

4. The method of claim 1, wherein the comparison of the CST to the stored CST measurements includes at least one comparison selected from the group consisting of:

the current CST for cooling is greater than a maximum of the stored CST measurements during the variable fan-off delay time P2 for cooling, the current CST for heating is less than a minimum of the stored CST measurements during the variable fan-off delay time P2 for heating, and the current CST for cooling or heating has reached an Inflection Point (IP) where the dT/dt equals zero plus or minus a confidence interval tolerance inflection.

5. The method of claim 1, wherein:

the HVAC system includes an economizer with economizer dampers; and the economizer dampers are positioned to a closed or open position during the variable fan-off delay time P2 and the economizer dampers are closed when the fan is turned off.

6. The method of claim 1, wherein the cooling or heating fan-off delay differential or differential offset varies based on at least one HVAC parameter selected from the group consisting of: the variable fan-off delay time P2, a heating cycle duration P3, a cooling cycle duration P4, an off-cycle time P11, a Temperature Split (TS) defined as the difference between a Return Air Temperature (RAT) and a Supply Air Temperature (SAT), a Temperature Rise (TR) defined as the difference between the SAT and the RAT, and the rate of change of the CST with respect to time dT/dt.

7. The method of claim 1, wherein turning on the HVAC fan to circulate air through the heating system includes switching the HVAC fan speed to a higher speed than when the HVAC fan is initially turned on during the thermostat call for heating.

8. The method of claim 7, wherein turning on the HVAC fan to circulate air through the heating system includes providing at least one signal selected from the group consisting of:
a signal to turn on the HVAC fan and circulate air through the heating system,
a signal to switch the HVAC fan to a higher speed and circulate air through the heating system,
a rectified or half-wave rectified signal to switch the HVAC fan to a higher speed and circulate air through the heating system,
a power line modulation signal to switch the HVAC fan to a higher speed and circulate air through the heating system, and
a wireless signal to switch the HVAC fan to a higher speed and circulate air through the heating system.

9. The method of claim 1, wherein a Remote Thermostat Unit (RTU) is used to communicate with the thermostat using a WIFI or wired communication channel and provide at least one HVAC measurement signal selected from the group consisting of: a Return Air Temperature (RAT), a Supply Air Temperature (SAT), a Mixed Air Temperature (MAT), an Outdoor Air Temperature (OAT), an Occupancy, a Relative Humidity (RH), a Carbon Dioxide ($CO_2$) concentration, a refrigerant temperature, a refrigerant pressure, a refrigerant flow rate, a compressor power (kW), a fan power (kW), a condenser fan power (kW), a gas valve signal, a hydronic supply temperature, a hydronic return temperature, and a hydronic pump power (kW).

10. The method of claim 1, wherein the thermostat provides at least one signal selected from the group consisting of: a signal to an HVAC fan to control the HVAC fan at a low speed, a signal to an HVAC fan to control the HVAC fan at a speed higher than the low speed, and a signal to an economizer controller during a fan-off delay to close or open the economizer dampers during the fan-off delay and the economizer dampers are closed when the fan is turned off.

11. The method of claim 1, wherein a thermostat temperature sensor is located in a convection pathway with at least one heat generating electronic component located near the top of the convection pathway to induce thermal siphoning of conditioned space air into the convection pathway to improve heat transfer from the air to the thermostat temperature sensor and increase the accuracy of the thermostat temperature sensor.

12. The method of claim 1, wherein the thermostat maintains a continuous Heat Pump (HP) reversing valve signal throughout at least one HVAC system operating cycle selected from the group consisting of: a HP compressor cooling cycle duration plus a variable fan-off delay duration, and a HP compressor heating cycle duration plus a variable fan-off delay duration.

13. The method of claim 1, wherein the heating differential or the cooling differential or the differential offsets are adjusted based on at least one time period selected from a group consisting of: the variable fan-off delay time P2, a heating cycle duration P3, a cooling cycle duration P4, and an off-cycle time P11.

14. The method of claim 1, wherein the variable fan-off delay time P2 is discontinued when the rate of change of the CST with respect to time (dT/dt) has reached the Inflection Point (IP) of zero plus or minus a confidence interval tolerance one or more times where the dT/dt is defined as the difference in temperature between at least two measurements of the CST divided by the difference in time between the at least two measurements of the CST.

15. The method of claim 1, wherein the variable fan-off delay time P2 is discontinued based on comparing the current CST to a previously monitored and stored CST value measured during the current variable fan-off delay.

16. The method of claim 1, wherein the variable fan-off delay time P2 is discontinued when the CST crosses the cooling or the heating fan-off delay differential or differential offset one or more times.

17. The method of claim 1, wherein the economizer damper is closed during the fan-off delay for HVAC systems with economizer dampers.

18. The method of claim 1, wherein the fan-only Fault Detection Diagnostic (FDD) procedure comprises reporting a FDD alarm fan-on message using at least one method selected from the group consisting of: a display, an email message, a text message, and an audio communication.

19. The method of claim 1, wherein overriding the fan-on setting and turning off the HVAC fan includes at least one action selected from the group consisting of: turning off the HVAC fan, turning off the HVAC fan before or after the thermostat call for cooling, turning off the HVAC fan before or after the thermostat call for heating, and turning off the HVAC fan after the variable fan-off delay time P2.

20. The method of claim 1, wherein the off-cycle rate of change of the CST with respect to time dT/dt-off is defined as the difference in temperature between at least two measurements of the CST during the previous cooling off-cycle or the previous heating off-cycle divided by a difference in time between the at least two measurements of the CST during the previous cooling off-cycle or the previous heating off-cycle.

21. A method for controlling a Heating Ventilating Air Conditioning (HVAC) system with a thermostat, the method comprising:
the thermostat turning on or continuing to turn on the HVAC fan and continue operating the HVAC fan after the end of the thermostat call for heating or thermostat call for cooling for a variable fan-off delay time P2 where the variable fan-off delay time P2 is discontinued based on comparing a current Conditioned Space Temperature (CST) to a previously monitored and stored CST value measured during the current variable fan-off delay.

22. The method of claim 21, wherein:
the HVAC system includes an economizer with economizer dampers: and
the economizer dampers are positioned to a closed or open position during the variable fan-off delay time P2 and the economizer dampers remain closed when the fan is turned off at the end of the variable fan-off delay time P2.

23. A method for controlling a Heating Ventilating Air Conditioning (HVAC) system with a thermostat, the method comprising:
the thermostat turning on or continuing to turn on the HVAC fan and continue operating the HVAC fan after the end of the thermostat call for heating or the thermostat call for cooling for a variable fan-off delay time P2 where the variable fan-off delay time P2 is discontinued based on a rate of change of a Conditioned Space Temperature (CST) with respect to time (dT/dt) has reached an Inflection Point (IP) of zero plus or minus a confidence interval tolerance one or more times where the CST with respect to time dT/dt is defined as a difference in temperature between at least two measurements of a CST divided by a difference in time between the at least two measurements of the CST.

24. The method of claim 23, wherein:
the HVAC system includes an economizer with economizer dampers: and
the economizer dampers are positioned to a closed or open position during the variable fan-off delay and the economizer dampers remain closed when the fan is turned off.

25. A method for controlling a Heating Ventilating Air Conditioning (HVAC) system with a thermostat, the method comprising:
the thermostat turning on or continuing to turn on the HVAC fan and continue operating the HVAC fan after the end of the thermostat call for heating or thermostat call for cooling for a variable fan-off delay time P2 where the variable fan-off delay time P2 is discontinued when a Conditioned Space Temperature (CST) crosses a cooling or a heating fan-off delay differential or differential offset one or more times.

26. The method of claim 25, wherein:
the HVAC system includes an economizer with economizer dampers: and
the economizer dampers are positioned to a closed or open position during the variable fan-off delay and the economizer dampers are closed when the fan is turned off.

27. A method for controlling a Heating Ventilating Air Conditioning (HVAC) system with a thermostat, the method comprising:
the thermostat performing a fan-only Fault Detection Diagnostic (FDD) procedure comprising the thermostat monitoring a HVAC fan operating time, detecting that the HVAC fan is controlled by a fan-on setting, determining that the HVAC fan operating time is greater than a Threshold Fan-on Time (TFT), and performing at least one action selected from the group consisting of: providing a FDD alarm fan-on message, and overriding the fan-on setting and turning off the HVAC fan.

28. The method of claim 27, wherein the TFT is adjustable based on at least one HVAC parameter selected from the group consisting of: a variable fan-off delay time P2, a heating cycle duration P3, a cooling cycle duration P4, an off-cycle time P11, a Conditioned Space Temperature (CST), a rate of change of a Conditioned Space Temperature (CST) with respect to time (dT/dt), a Temperature Split (TS) defined as the difference between a Return Air Temperature (RAT) and a Supply Air Temperature (SAT), a Temperature Rise (TR) defined as the difference between a SAT and RAT, an Outdoor Air Temperature, a Carbon Dioxide (CO2) measurement, an indoor air quality requirement, and an occupancy sensor signal.

29. The method of claim 27, wherein the TFT is at least one time period selected from the group consisting of: 60 minutes, and adjustable from 60 minutes based on HVAC parameters to provide outdoor air ventilation based on occupancy or to meet minimum acceptable indoor air quality requirements.

30. The method of claim 27, wherein the fan-only Fault Detection Diagnostic (FDD) procedure comprises reporting a FDD alarm fan-on message using at least one method selected from the group consisting of: a display, an email message, a text message, and an audio communication.

31. The method of claim 27, wherein overriding the fan-on setting and turning off the HVAC fan includes at least one action selected from the group consisting of: turning off the HVAC fan, turning off the HVAC fan before or after the thermostat call for cooling, turning off the HVAC fan before or after the thermostat call for heating, and turning off the HVAC fan after the variable fan-off delay time P2.

32. A method for controlling a Heating Ventilating Air Conditioning (HVAC) system with a thermostat, the method comprising the thermostat turning on or continuing to turn on the HVAC fan and continue operating the HVAC fan after the end of a thermostat call for cooling or a thermostat call for heating for a variable fan-off delay time P2 where the variable fan-off delay time P2 is discontinued based on at least one method selected from the group consisting of:
the rate of change of the CST with respect to time (dT/dt) measured during a current cooling variable fan-off delay is greater than a previous cooling off-cycle rate of change of the CST with respect to time (dT/dt-off), and
the rate of change of the CST with respect to time (dT/dt) measured during a current heating variable fan-off delay is less than a previous heating off-cycle rate of change of the CST with respect to time (dT/dt-off).

33. The method of claim 32, wherein the CST with respect to time dT/dt is defined as a difference in temperature between at least two measurements of the CST divided by a difference in time between the at least two measurements of the CST, and the off-cycle CST with respect to time dT/dt-off is defined as the difference in temperature between at least two measurements of the CST during the previous cooling off-cycle or the previous heating off-cycle divided by a difference in time between the at least two measurements of the CST during the previous cooling off-cycle or the previous heating off-cycle.

34. A method for controlling a Heating Ventilating Air Conditioning (HVAC) system with a thermostat, the method comprising:
the thermostat performing a fan-only Fault Detection Diagnostic (FDD) procedure comprising monitoring a HVAC fan operating time, detecting that the HVAC fan is controlled by a fan-on setting, determining that the HVAC fan operating time is greater than a Threshold Fan-on Time (TFT), and providing a FDD alarm fan-on message using at least one method selected from the group consisting of: a display, an email message, a text message, and an audio communication.

35. The method of claim 34, wherein the TFT is at least one time period selected from the group consisting of: 60 minutes, and adjustable from 60 minutes based on HVAC parameters to provide outdoor air ventilation based on occupancy or to meet minimum acceptable indoor air quality requirements.

* * * * *

UNITED STATES PATENT AND TRADEMARK OFFICE
CERTIFICATE OF CORRECTION

PATENT NO. : 10,712,036 B2
APPLICATION NO. : 16/289313
DATED : July 14, 2020
INVENTOR(S) : Mowris et al.

It is certified that error appears in the above-identified patent and that said Letters Patent is hereby corrected as shown below:

On the Title Page

Item (62) "Related U.S. Application Data" field replace the following information:
"(62) Division of application No. 15/614,600, filed on Jun. 5, 2017, now Pat. No. 10,281,938."

With:
"(62) Continuation-in-part of application No. 15/614,600, filed on Jun. 5, 2017, now Pat. No. 10,281,938, which is a continuation-in-part of application No. 15/358,131 filed Nov. 22, 2016, now Pat. No. 9,671,125, which is a continuation-in-part of application No. 15/251,978 filed Aug. 30, 2016, now Pat. No. 9,500,386, which is a continuation-in-part of application No. 15/144,806 filed May 02, 2016, now Pat. No. 9,995,493."

In the Specification

Column 1 Lines 8-11 replace:
"The present application is a Continuation In Part of U.S. patent application Ser. No. 15/614,600 filed Jun. 5, 2017, which application is incorporated in its entirety herein by reference."

With:
"The present application is a Continuation In Part of U.S. patent application Ser. No. 15/614,600 filed Jun. 5, 2017, which application is incorporated in its entirety herein by reference, which is a Continuation in Part of U.S. patent application Ser. No. 15/358,131 filed Nov. 22, 2016, which is a Continuation in Part of U.S. patent application Ser. No. 15/251,978 filed Aug. 30, 2016, which is a Continuation in Part of U.S. patent application Ser. No. 15/144,806 filed May 02, 2016."

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*